(12) United States Patent
Yoda et al.

(10) Patent No.: US 6,671,039 B2
(45) Date of Patent: Dec. 30, 2003

(54) SPECTACLE LENS IMAGE SENSING PROCESSING APPARATUS AND SPECTACLE LENS POSITIONING METHOD

(75) Inventors: Toshiro Yoda, Tokyo (JP); Norihisa Tanaka, Tokyo (JP); Masahiko Samukawa, Tokyo (JP)

(73) Assignee: Hoya Corporation (JP)

( * ) Notice: Subject to any disclaimer, the term of this patent is extended or adjusted under 35 U.S.C. 154(b) by 261 days.

(21) Appl. No.: 09/888,284

(22) Filed: Jun. 21, 2001

(65) Prior Publication Data
US 2001/0055111 A1 Dec. 27, 2001

(30) Foreign Application Priority Data

Jun. 22, 2000 (JP) .................... 2000-188344
Jun. 22, 2000 (JP) .................... 2000-188346
Jul. 6, 2000 (JP) .................... 2000-205060

(51) Int. Cl.[7] .................................. G01B 9/00
(52) U.S. Cl. ...................... 356/127; 356/124
(58) Field of Search .................. 356/127, 124, 356/124.5, 125, 126

(56) References Cited
U.S. PATENT DOCUMENTS 5,867,259 A * 2/1999 Yanagi et al. ............... 356/124
5,926,247 A * 7/1999 Kimura ...................... 351/41

FOREIGN PATENT DOCUMENTS

| JP | 2-216428 | 8/1990 |
| JP | 6-079600 | 3/1994 |
| JP | 49-122374 | 11/1997 |
| JP | 11-295672 | 10/1999 |

* cited by examiner

Primary Examiner—Frank G. Font
Assistant Examiner—Roy M Punnoose
(74) Attorney, Agent, or Firm—Townsend and Townsend and Crew LLP; Kenneth R. Allen

(57) ABSTRACT

A spectacle lens image sensing processing apparatus irradiates the convex surface of a lens to be examined with light from a light source, projects an image of the convex surface onto a reflection screen placed on the concave surface side of the lens. The apparatus senses the image of the convex surface, projected on the reflection screen, by using an image sensing unit, and performs image processing for the image of the convex surface sensed by the image sensing unit by using an image processing unit, thereby detecting optical characteristics of the lens. The image sensing unit is placed together with the light source on the convex surface side of the lens. The image of the convex surface of the lens is reflected by the reflection screen to return to the convex surface side of the lens, thereby forming the image on the image sensing unit. A spectacle lens positioning method is also disclosed.

17 Claims, 17 Drawing Sheets

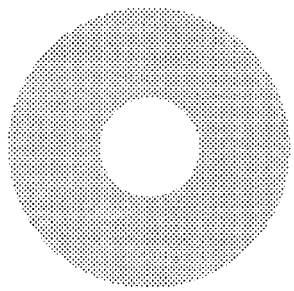 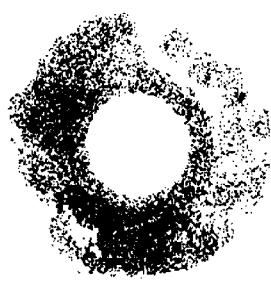 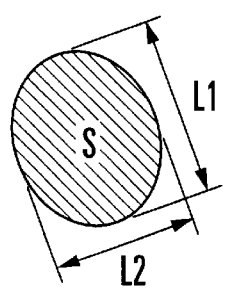
FIG.11A  FIG.11B  FIG.11C
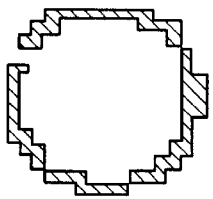 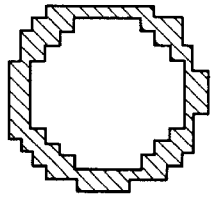 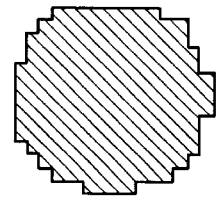
FIG.11D  FIG.11E  FIG.11F
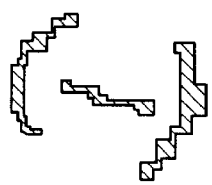 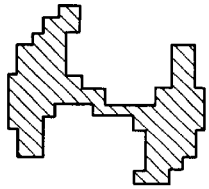 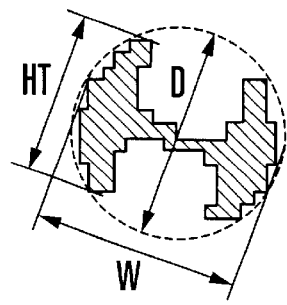
FIG.11G  FIG.11H  FIG.11I

SPECTACLE LENS IMAGE SENSING PROCESSING APPARATUS AND SPECTACLE LENS POSITIONING METHOD

BACKGROUND OF THE INVENTION

The present invention relates to a spectacle lens image sensing processing apparatus and spectacle lens positioning method which can be suitably used for a layout blocker for determining a lens processing center or the like for edging of a spectacle lens and mounting a processing jig at the processing center.

In general, when a lens blank (uncut lens) is to be edged into a shape conforming to the frame of an eyeglass frame, the optical characteristics of the prescription lens, e.g., the optical center, geometrical center, diameter, eyepoint position, lens power, and cylinder axis are checked in the pre-process, and a processing center, the mounting angle of a processing jig (to be generally called a lens holder) with respect to the lens, and the like (optical layout) are determined from the lens information, lens frame shape data, and prescription data about a wearer. On the basis of this information, the center of the lens holder is positioned to the processing center of the lens, and the lens holder is mounted on the lens surface (blocking). In general, the processing center of the lens coincides with the eyepoint position of the lens. In processing, the rim of the lens is edged by a grind stone or cutter to match the pupil center (eyepoint) of a wearer to the eyepoint position of the lens, thereby processing the lens into a shape conforming to the shape of an eyeglass frame.

Conventionally, an optical layout procedure and blocking for a lens, which are included in the pre-process for edging of the lens, are manually performed by an operator using specialized devices. For example, the lens power of a lens to be examined is measured by a power measuring device called a lens meter.

When a lens 1 to be examined is a progressive multifocal lens, micro engraved marks 3A and 3B are formed at reference positions spaced apart from a geometrical center O by a predetermined distance, as shown in FIG. 17. Since the lens 1 is designed to derive the geometrical center O, the optical centers of distance and near portions, an eyepoint 11, and the like from the positions of these micro engraved marks 3A and 3B, the position of the eyepoint 11 is detected from the positions of these micro engraved marks 3A and 3B, and a lens holder is mounted at the position of the eyepoint 11. FIG. 18 shows another example of the progressive multifocal lens 1. The progressive multifocal lens 1 shown in FIG. 18 is a right-eye lens whose micro engraved marks 3A and 3B both are circular.

In an optician's shop, when the position of the eyepoint 11 is to be detected from the micro engraved marks 3A and 3B, the marks are generally detected by a visual check or optically. In the case of a visual check, the micro engraved marks 3A and 3B are detected by holding the lens to light from a light source such as a fluorescent lamp, and the detected position is marked with a marker. Thereafter, the position of the eyepoint 11 is determined by using a sheet called a remark chart for a progressive multifocal lens. The remark chart lists actual-size images of progressive multifocal lenses by lens type, showing the positions of micro engraved marks, geometrical centers, distance power measuring portions, near power measuring portions, the positions of eyepoints, and the like. The lens 1 on which the positions of the micro engraved marks 3A and 3B are marked is placed on this chart. In this case, the lens 1 is placed on an image of the same type of lens as the lens to be examined of the lenses listed on the remark chart, and the positions of the micro engraved marks 3A and 3B marked on the lens 1 are matched to the positions of the micro engraved marks shown on the remark chart. The position of the eyepoint shown on the remark chart is indicated on the convex surface of the lens 1 with a marker. Thereafter, the center of the lens holder is positioned to the marked eyepoint 11, and the lens holder is mounted.

As a method of positioning a lens and lens holder by optically detecting the micro engraved marks 3A and 3B, for example, the spectacle lens positioning method and apparatus disclosed in Japanese Patent Laid-Open No. 11-295672 (to be referred to as the prior art hereinafter) are known. According to this prior art, a spectacle lens is positioned on the basis of the positional relationship and positional information of positioning marks (micro engraved marks, addition power) formed on the convex surface of the spectacle lens. An illumination adjustment lens is interposed between an illumination unit and the spectacle lens to irradiate the spectacle lens with light emitted from the illumination unit from the concave surface side through the illumination adjustment lens, and an image on the concave surface is sensed by an image input means such as a CCD. This sensed image is processed by an image processing unit to detect the positioning marks. A computation is then made to establish a predetermined positional relationship between the horizontal reference line of the spectacle lens and the position of an optical center on the basis of the positional relationship and positional information of these marks. The spectacle lens is positioned on the basis of the computation result.

If the lens to be examined is a multifocal lens (in general, a bi-focal lens), no micro engraved marks are formed on the lens unlike the progressive multifocal lens 1 described above. In general, therefore, as shown in FIG. 19, this lens is designed to obtain the positions of an geometrical center O and eyepoint 16 with reference to an upper rim 17 of a segment 13B. Therefore, when the position of the eyepoint 16 is to be detected by a visual check, the position of the eyepoint 16 can be determined by using a remark chart for multifocal lenses as in the case of the progressive multifocal lens 1 described above. When this position is to be optically detected, the lens positioning method and apparatus disclosed in the prior art can be used.

As described above, in the prior art, an optical layout procedure and blocking for a lens, which are included in the pre-process for edging of the lens, are manually performed by an operator using specialized devices. This processing is very inefficient and low in productivity, and hence becomes a serious hindrance to labor savings. In addition, since an operator must handle the lens with great care so as not to soil, damage, and break it, a significant burden is imposed on the operator. For this reason, demands have recently arisen for the development of an ABS (Auto Blocker for Single vision lens) for single-focus lenses and ABM (Auto Blocker for Multifocus lens) for progressive multifocal lenses and multifocal lenses, which are designed to automatically perform an optical layout procedure for a lens and lens blocking with a lens holder, thereby improving operation efficiency. In designing an ABM, in particular, since two types of lenses, i.e., a progressive multifocal lens and multifocal lens, are handled, the apparatus is required to have a device for sensing an image of the convex surface of a lens, detecting micro engraved marks or the upper rim of a segment by performing image processing for the sensed image, and detecting the optical characteristics (the position of a geometrical center, the position of an eyepoint, and the like) of the lens from these pieces of positional information as well as a lens meter for measuring a lens power.

Lens meters have been known, and, for example, the lens meters disclosed in Japanese Patent Laid-Open Nos. 49-122355 and 60-17355 and Japanese Patent Publication No. 8-20334 can be used. As a device for detecting the optical characteristics of a lens, the positioning method and apparatus disclosed in the above reference can be used. However, these positioning method and apparatus are difficult to apply to a lens having an astigmatic power, and hence are not practical. That is, in the prior art, since the light source and image sensing means are respectively arranged on the convex surface side and concave surface side of a lens, if the lens has an astigmatic power, the image sensed by the image sensing means distorts due to the cylinder axis, and image processing demands complicated correction, regardless of whether the lens is a single-focus lens, multifocal lens, or progressive multifocal lens.

As a technique of accurately and automatically positioning the progressive multifocal lens 1 and lens holder by detecting the micro engraved marks 3A and 3B, a method of image-sensing the progressive multifocal lens 1 upon optically magnifying it, detecting the positions of the micro engraved marks 3A and 3B from the sensed input image by template matching of comparing the input image with a prepared partial image (template), and calculating the position of the eyepoint 11 from the detected positions is known.

The progressive multifocal lens 1 is image-sensed after it is optically magnified for the following reason. If the lens is image-sensed without optically magnifying it, the resultant image becomes as small as several pixels. In using template matching, however, an image having a size of at least 10×10 pixels is required. According to this method using template matching, the progressive multifocal lens 1 and lens holder can be accurately positioned.

In the method using template matching, however, since the progressive multifocal lens 1 must be image-sensed after it is optically magnified, a magnifying optical system is required, resulting in an increase in cost. In addition, template matching requires much time.

As another method of detecting the position of an eyepoint 16 of a multifocal lens 13 from the contour shape of a segment 13B, the spectacle lens positioning apparatus disclosed in Japanese Patent Laid-Open No. 6-79600 is known. This positioning apparatus is designed to image-sense the multifocal lens 13 to be processed by using a video camera and display the sensed contour image of the segment 13B of the multifocal lens 13 on the screen of a TV monitor. The apparatus is also designed to calculate the contour image data of the segment 13B from the processing information about the multifocal lens 13 which is stored in advance and display the calculated contour image as a reference image on the screen of the TV monitor.

An operator moves a slide table, on which the multifocal lens 13 is mounted, to superimpose on the reference image the real image of the contour line of the segment 13B displayed on the screen of the TV monitor, thereby positioning the multifocal lens 13 to the normal position. After this positioning, a pad printer of a marking unit transfers a cross-shaped mark corresponding to a processing reference line onto a predetermined position on the multifocal lens 13. As described above, the positioning apparatus disclosed in Japanese Patent Laid-Open No. 6-79600 is designed to position the multifocal lens 13 while watching the TV monitor instead of a remark chart.

Although the positioning apparatus disclosed in Japanese Patent Laid-Open No. 6-79600 saves an operator from marking the multifocal lens 13, the operator must manually position the multifocal lens 13 while watching the screen of the TV monitor. This imposes a great burden on the operator as in the case of a remark chart.

SUMMARY OF THE INVENTION

It is an object of the present invention to provide a spectacle lens image sensing processing apparatus which can easily perform image processing for even a lens having an astigmatic power and detect optical characteristics of the lens, and more specifically a geometrical center and eyepoint position. It is another object of the present invention to provide a spectacle lens image sensing processing apparatus which can also measure a lens power.

It is still another object of the present invention to provide a spectacle lens positioning method and spectacle lens image sensing processing apparatus which can accurately position a progressive multifocal lens and a lens holder at a lower cost more efficiently and quickly than the prior art.

It is still another object of the present invention to provide a spectacle lens positioning method and spectacle lens image sensing processing apparatus which can accurately position a multifocal lens and a lens holder more efficiently and quickly than the prior art.

In order to achieve the above objects, according to the present invention, there is provided a spectacle lens image sensing processing apparatus for irradiating a convex surface of a lens to be examined with light from a light source, projecting an image of the convex surface onto image display means placed on a concave surface side of the lens, sensing the image of the convex surface, projected on the image display means, by using an image sensing unit, and performing image processing for the image of the convex surface sensed by the image sensing unit by using an image processing unit, thereby detecting an optical characteristic of the lens, wherein the image sensing unit is placed together with the light source on the convex surface side of the lens, the image display means is formed by a reflection screen, and the image of the convex surface of the lens is reflected by the reflection screen to return to the convex surface side of the lens, thereby forming the image on the image sensing unit.

BRIEF DESCRIPTION OF THE DRAWINGS

FIGS. 11A to 11I are views for explaining how image processing is performed by an image processing unit in the third embodiment of the present invention;

FIG. 17 is a view showing the positional relationship between the marks on a progressive multifocal lens, the geometrical center, and the like;

FIG. 19 is a view showing the positional relationship between the segment of a multifocal lens, the geometrical center, the eyepoint, and the like.

DESCRIPTION OF THE PREFERRED EMBODIMENTS

The embodiments of the present invention will be described next in detail with reference to the accompanying drawings.

First Embodiment

Figure 1:
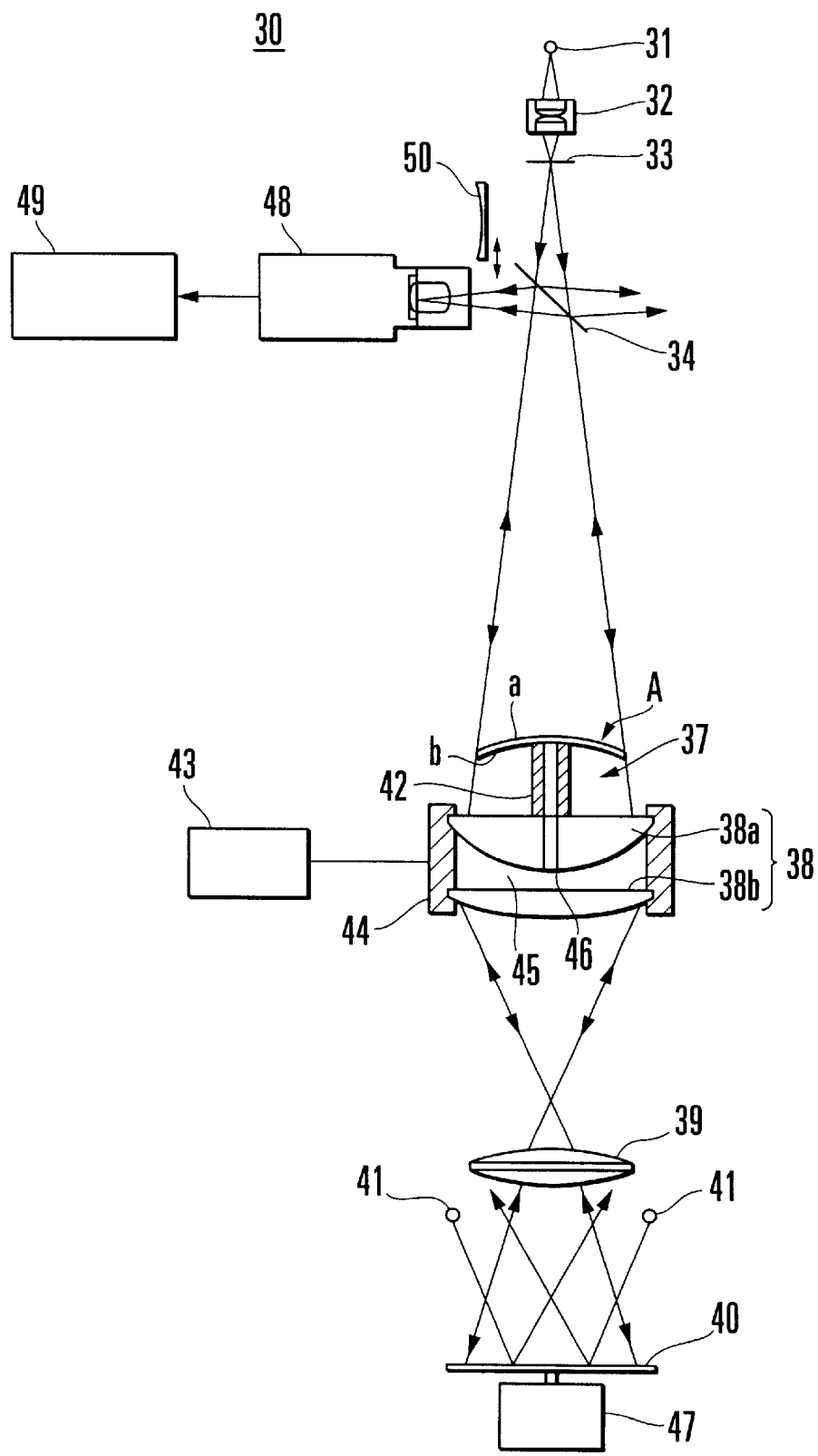
FIG. 1 is a schematic view showing a spectacle lens image sensing processing apparatus according to the first embodiment of the present invention.

FIG. 1 shows a spectacle lens image sensing processing apparatus according to the first embodiment of the present invention. In this embodiment, a spectacle lens image sensing processing apparatus (to be referred to as an image sensing processing apparatus hereinafter) 30 can detect the optical characteristics (the position of an eyepoint, geometrical center, and the like) of a lens A to be examined, which includes two types of lenses, i.e., a progressive multifocal lens and multifocal lens. A progressive multifocal lens and multifocal lens will be described first with reference to FIGS. 17, 18, and 19.

Figure 17:
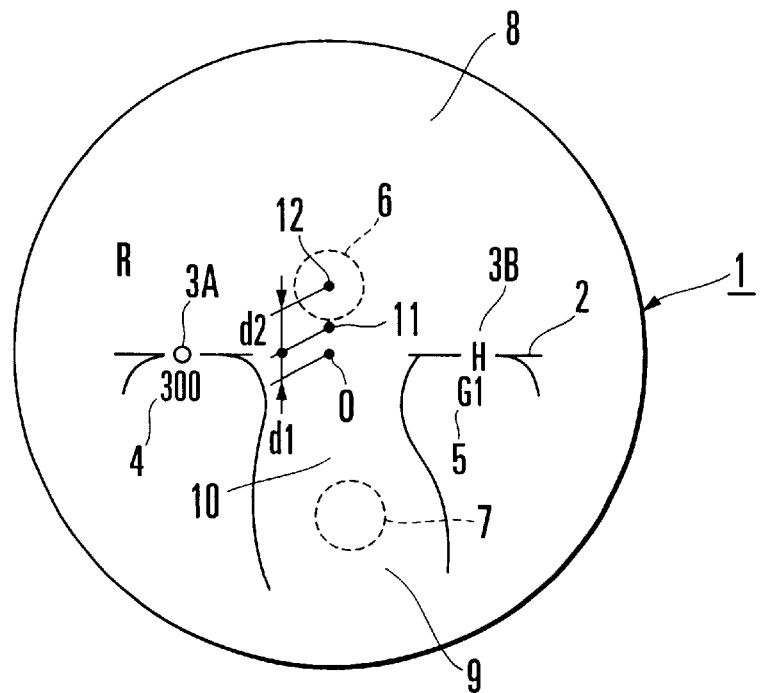

Referring to FIG. 17, reference numeral 1 denotes an uncut plastic progressive multifocal lens; 2, a horizontal reference line passing through a geometrical center O; and 3A and 3B, micro engraved marks formed at two positions spaced apart from the geometrical center O on the horizontal reference line 2 by an equal distance (e.g., 17 mm). These micro engraved marks 3A and 3B are indicated by identical small circles or identical small circles and characters. In addition, a numeral 4 representing the addition power (the difference between the refractive power at the outer vertex of a distance portion and the refractive power at the outer vertex of a near portion) of the lens 1 and an identification mark 5 representing the type of lens are respectively indicated below the marks in the form of small projections. The numeral 4 representing the addition power is indicated by three-digit numeral (e.g., 300) below the micro engraved mark located on the ear side of a wearer. The lens can therefore be identified as a left-eye lens or right-eye lens by detecting whether this three-digit numeral is indicated below the left or right mark. In the case shown in FIG. 17, the lens is a right-eye lens, and the left micro engraved mark 3A and right micro engraved mark B are indicated in small circle "○" and Roman letter "H". Note that the micro engraved marks 3A and 3B, the numeral 4 representing the addition power, and the identification mark 5 are formed in the shape of small projections (e.g., about 2 to 4 μm) on the convex surface of the lens in the molding process.

Reference numeral 6 denotes a distance power measuring portion; 7, a near power measuring portion; 8, a portion for seeing distant objects (distance portion); 9, a portion for seeing nearby objects (near portion); 10, a portion whose power continuously changes (progressive portion); and 11, an eyepoint. The positions of the distance power measuring portion 6, near power measuring portion 7, and eyepoint 11 vary depending on the design of a lens. However, predetermined reference positions separated from the geometrical center O are fixed. For example, the eyepoint 11 is fixed at a position separated upward from the geometrical center O by a predetermined distance d1 (e.g., 2 mm), and a distance center 12 is fixed at a position separated upward from the position of the eyepoint 11 by a predetermined distance d2 (e.g., 4 mm). Therefore, the position of the geometrical center O or eyepoint 11 can be obtained by inputting images of the micro engraved marks 3A and 3B and calculating their position coordinates by image processing.

Figure 18:
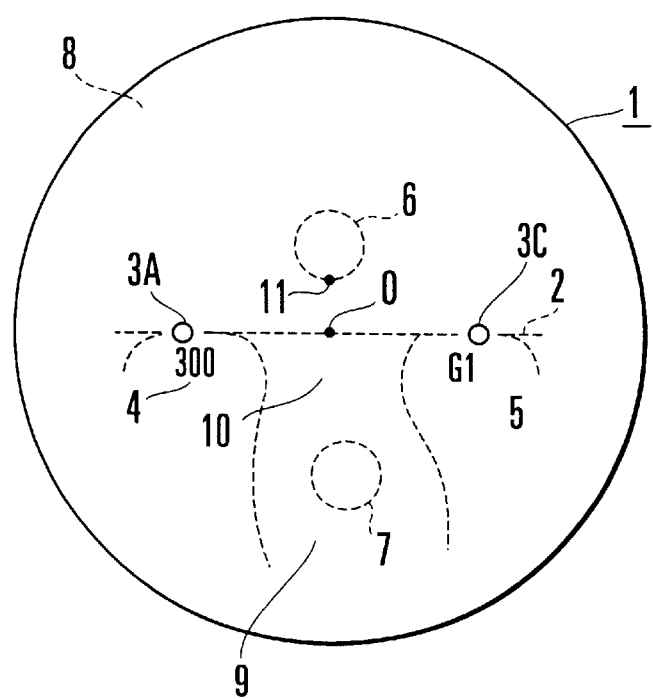
FIG. 18 is a plan view showing another example of the progressive multifocal lens.

The progressive multifocal lens 1 shown in FIG. 18 is a right-eye lens whose micro engraved marks 3A and 3B both are circular.

Figure 19:
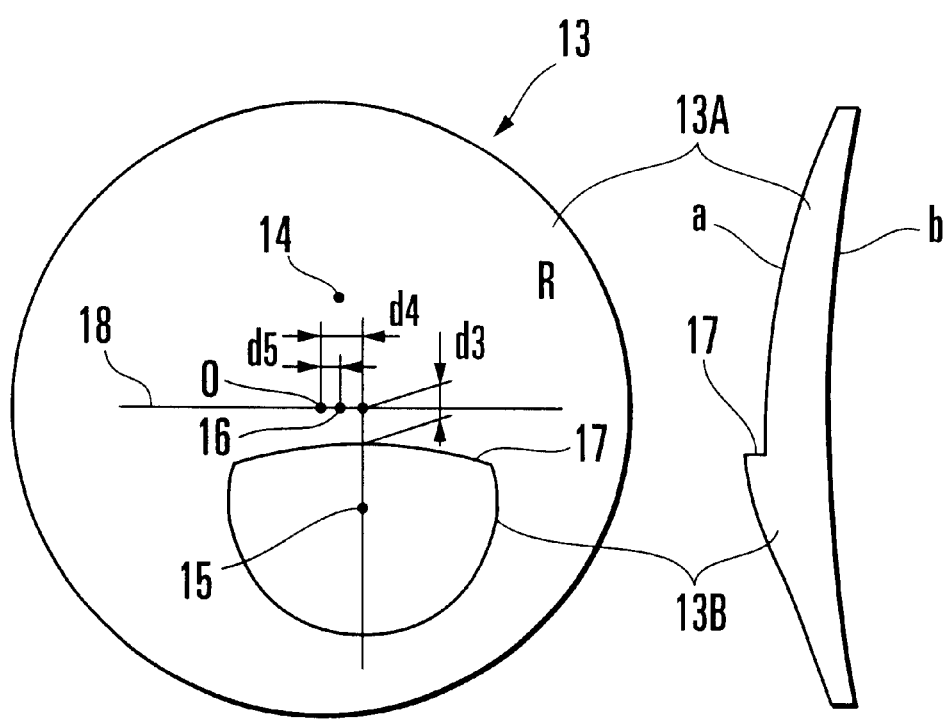

FIG. 19 shows a right-eye multifocal (bi-focal) lens 13 made of a plastic material. Reference numeral 13A denotes a main lens; 13B, a segment; 14, a distance power measuring portion; 15, the center of a near power measuring portion; O, a geometrical center; and 16, an eyepoint position. When the lens 13 is made of a plastic material, the segment 13B is formed on the surface of the main lens 13A so as to protrude in the form of a wedge in side view. An upper rim 17 of the segment 13B is separated downward from a horizontal reference line 18 passing through the geometrical center O by a predetermined distance d3 (e.g., 5 mm). In the case of a right-eye lens, the segment 13B is formed such that the center 15 of the near power measuring portion is shifted rightward from the geometrical center O by a predetermined distance d4 (e.g., 5 mm). The position of the eyepoint 16 is fixed at a position shifted from the geometrical center O toward the segment 13B on the horizontal reference line 18 by a predetermined distance d5 (e.g., 2.5 mm). If, therefore, an image of the segment 13B is sensed, and the coordinates of the middle position of the upper rim 17 are calculated by image processing, the positions of the geometrical center O and eyepoint 16 can be obtained. In the case of the multifocal lens 13, the upper rim 17 of the segment 13B corresponds to the micro engraved marks 3A, 3B, and 3C of the progressive multifocal lens 1. In addition, the lens can be identified as a left- or right-eye lens by detecting which side the geometrical center O of the segment 13B is shifted.

Referring to FIG. 1, the image sensing processing apparatus 30 includes a progressive multifocal lens light source 31, which is placed on the convex surface a side of the lens A, and a condenser lens 32, a stop 33, and a half mirror 34 which are placed in the optical path between the light source 31 and the lens A. The light source 31 is used when the lens A is the progressive multifocal lens 1 shown in FIG. 17. For example, an LED for emitting red light with a short wavelength is used as this light source 31 to obtain sharp images of the micro engraved marks 3A, 3B, and 3C, numeral 4 representing the addition power, and identification mark 5. As the half mirror 34, a mirror whose transmittance/reflectance ratio is 7:3 is used.

The image sensing processing apparatus 30 also includes a lens holder 37, condenser lens 38, imaging lens 39, reflection screen (image display means) 40, multifocal lens light source 41, and the like which are arranged on the concave surface b side of the lens A.

The lens holder 37 chucks/fixes the central portion of the concave surface of the lens A and includes a lens support cylinder 42 having two open ends. The central portion of the concave surface of the lens A is chucked/fixed on the upper surface of the lens support cylinder 42 by evacuating the interior of the lens support cylinder 42 using a vacuum pump 43. The outer diameter of the lens support cylinder 42 is small enough (e.g., 8 mm) to prevent interference with projection of the micro engraved marks 3A, 3B, and 3C, numeral 4 representing the addition power, and identification mark 5 of the progressive multifocal lens 1 and the projection of the segment 13B of the multifocal lens 13.

The condenser lens 38 focuses an image of the convex surface of the lens A and includes first and second convex lenses 38a and 38b arranged in a lens barrel 44. The enclosed space surrounded by the two convex lenses 38a and 38b and lens barrel 44 forms an exhaust chamber 45, which is connected to the vacuum pump 43. A communicating hole 46 is formed in the central portion of the convex lens 38a to make the interior of the lens support cylinder 42 communicate with the exhaust chamber 45.

The imaging lens 39 is formed by a convex lens, which forms the image of the convex surface of the lens A, which is focused by the condenser lens 38, on the reflection screen 40 in substantially the same size as that of the focused image. Note that this imaging lens 39 is used as a light-sending lens when the lens A is the multifocal lens 13.

A reflecting sheet is bonded to the reflection screen 40. This sheet is formed by coating the surface of a base member with a fine powder such as a glass or aluminum powder as particles that increase the reflectance and improve the light scattering effect. The reflection screen 40 is rotated at a high speed (e.g., 3,400 rpm) by a motor 47 to reflect the image of the convex surface of the lens A, thereby making the surface brightness and background uniform. This increases the contrast between a micro engraved mark portion and an non-micro engraved mark portion. The image of the concave surface of the lens A returns to the convex surface a side of the lens A through the initial optical path and is reflected by the half mirror 34 to be formed on the light-receiving surface of an image sensing unit 48. This image is input to an image processing unit 49 such as a CCD to be subjected to image processing.

The multifocal lens light source 41 is used for image-sensing of the multifocal lens 13 shown in FIG. 19. Red LEDs are used for this light source. For example, eight LEDs are arranged at an equal interval in the circumferential direction below the imaging lens 39 near its outer circumference. Light from the light source 41 is reflected by the reflection screen 40, passes through the imaging lens 39 and condenser lens 38, and strikes the concave surface b of the lens A. An image of the convex surface of the lens A is then reflected by the half mirror 34 to be formed on the image sensing unit 48. In image-sensing the progressive multifocal lens 1, a focus correction lens 50 is inserted between the half mirror 34 and the image sensing unit 48. The reason why the multifocal lens 13 is irradiated by the light source 41 from the concave surface b side is that the upper rim 17 of the segment 13B can be projected more clearly than when the multifocal lens 13 is irradiated from the convex surface a side.

In this image sensing processing apparatus 30, if the lens A is the progressive multifocal lens 1 shown in FIG. 17, the lens A is mounted on the upper surface of the lens support cylinder 42 with the convex surface a facing up. The interior of the lens support cylinder 42 and exhaust chamber 45 are then evacuated by the vacuum pump 43 to chuck/fix the lens A on the opening portion of the upper surface of the lens support cylinder 42. Thereafter, the light source 31 is turned on to irradiate the convex surface a of the lens A, and an image of the convex surface on which the micro engraved marks 3A, 3B, and 3C, numeral 4 representing the addition power, and identification mark 5 are indicated is focused by the condenser lens 38 and projected on the reflection screen 40 by the imaging lens 39. The image projected on the reflection screen 40 is reflected by the reflection screen 40 to return to the convex surface a side of the lens A through the initial optical path. The image is then formed on the image sensing unit 48 through the half mirror 34. The image processing unit 49 receives this image and performs image processing to detect the micro engraved marks 3A, 3B, 3C, numeral 4 representing the addition power, and identification mark 5 and calculate the positions of the micro engraved marks 3A and 3B. The image processing unit 49 also identifies the lens as a left- or right-eye lens on the basis of the position of the numeral 4 representing the addition power, and detects the type of lens from the identification mark 5. In addition, the image processing unit 49 obtains the positions of the geometrical center O of the lens and eyepoint 11 and the like from the positional information of the micro engraved marks 3A, 3B, and 3C by arithmetic processing. The mounting angle of the lens holder around the axis and the like with respect to the processing center and lens are determined from the obtained lens information, lens frame shape data, and the prescription data of a wearer.

When the lens A is the multifocal lens 13 shown in FIG. 19, the lens A is placed on the upper surface of the lens support cylinder 42, and the lens support cylinder 42 and exhaust chamber 45 are evacuated by the vacuum pump 43 to chuck/fix the lens A on the lens support cylinder 42, as in the above case of the progressive multifocal lens 1. In this case, the multifocal lens light source 41 is used instead of the progressive multifocal lens light source 31. In addition, the focus correction lens 50 is inserted in the optical path between the half mirror 34 and the image sensing unit 48, and the image sensing unit 48 is focused on the convex surface a of the lens A. When the light source 41 is turned on, the emitted light is reflected by the reflection screen 40, passes through the imaging lens 39 and condenser lens 38, and strikes the multifocal lens 13 from the concave surface b side, thereby guiding an image of the upper rim 17 of the segment 13B, formed on the convex surface a side, to the image sensing unit 48 through the half mirror 34. This image is input to the image processing unit 49 and subjected to image processing, thereby detecting the upper rim 17 and calculating its position. In addition, the positions of the geometrical center O and eyepoint 16 and the like are calculated from the positional information of the upper rim 17. The mounting angle of the lens holder around the axis and the like with respect to the processing center and lens are determined from the obtained lens information, lens frame shape data, and the prescription data of a wearer.

As described above, in the image sensing processing apparatus 30 according to this embodiment, the progressive multifocal lens light source 31 and image sensing unit 48 are arranged on the convex surface a side of the lens A. When the lens A is the progressive multifocal lens 1, and an image of the convex surface of the lens is sensed, the image of the convex surface of the lens A is projected on the reflection screen 40 placed on the concave surface b side, and the image reflected by the reflection screen 40 is returned to the convex surface a side of the lens A to be guided to the image sensing unit 48. Even if, therefore, the lens A has an astigmatic power, no image distortion is caused by the cylinder axis, and a good image can be obtained. When the lens A is irradiated with light from the convex surface a side, an image of the convex surface distorts due to the cylinder axis when it passes through the lens A, and the distorted image is projected on the reflection screen 40. When this distorted image is reflected by the reflection screen 40, it returns to the convex surface a side through the lens A. At this time, the image distorts due to the cylinder axis to cancel out the distortion of the image in the initial optical path. As a consequence, the image without distortion is formed on the light-receiving surface of the image sensing unit 48 to allow the image processing unit 49 to easily perform image processing without adding any complicated correction. When the lens A is the multifocal lens 13, the lens is irradiated with light from the concave surface side to directly image-sense a shadow of the upper rim 17 of the segment 13B on the convex surface side by using the image sensing unit 48. This makes it possible to obtain a good image without causing any distortion of the image due to the cylinder axis. In this case as well, therefore, image processing is facilitated.

Figure 2:
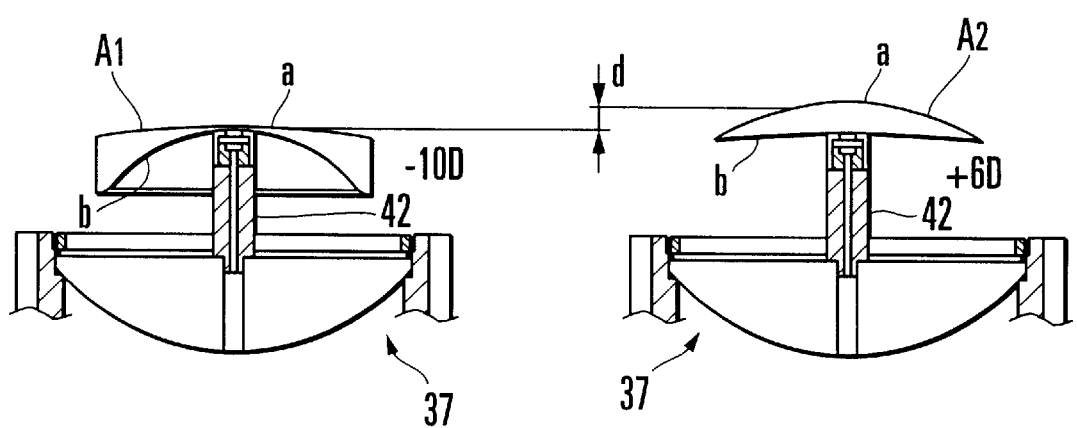
FIG. 2 is a view showing the difference in level between lens surfaces.

Furthermore, in this embodiment, since the central portion of the concave surface b of the lens A is chucked/fixed by the lens holder 37, the lens A can be reliably fixed. Even if, positive and negative lenses are used as lenses A, the difference in height between the convex surfaces can be reduced as compared with a case where each lens is simply placed on a glass plate. More specifically, as shown in FIG. 2, when a negative lens A1 having a power of −10 D and a positive lens having a power of +6 D are chucked/fixed by using the lens holder 37, a height difference d between convex surfaces a is 6.8 mm. That is, this difference can be made to be smaller than the height difference (11.3 mm) between the convex surfaces of the lenses that are simply placed on a glass plate. This makes it possible to reduce the focal depth of the optical system and obtain a bright, easy-to-see projection image. In addition, if a lens is placed on the glass plate, halation occurs. However, since the narrow lens support cylinder 42 is used, the occurrence of halation can also be prevented.

As described above, in the image sensing processing apparatus 30, the image sensing unit 48 is placed on the convex surface side of the lens A, and the convex surface of the lens A is irradiated with light from the light source 31. An image of this convex surface is then reflected by the reflection screen 40 placed on the concave surface side of the lens A to return to the convex surface side of the lens A so as to be formed on the image sensing unit 48. With this arrangement, even if a lens having an astigmatic power is handled, an image does not distort due to the cylinder axis. Hence, a good image can be obtained. This facilitates image processing and the design of an image processing circuit. This arrangement can be suitably used for an ABM, in particular.

In addition, since this apparatus includes the multifocal lens light source 41 for irradiating the concave surface of the lens A with light, if the lens A is a multifocal lens, optical characteristics, e.g., the eyepoint position and geometrical center, can be detected by sensing an image of the segment 13B and performing image processing for the sensed image. Furthermore, since the lens A is irradiated with light from the concave surface side, and an image of the segment 13B on the surface side is guided to the image sensing unit 48, even if a lens having an astigmatic power is handled, no image distortion caused by the cylinder axis, a good image can be obtained as in the case of a progressive multifocal lens, and image processing is facilitated.

Since the reflection screen 40 for which surface treatment for producing a light scattering effect is performed is rotated by the motor 47 serving as a driving unit, the brightness of the screen surface serving as the background of an image is made uniform. This facilitates image processing.

Second Embodiment

Figure 3:
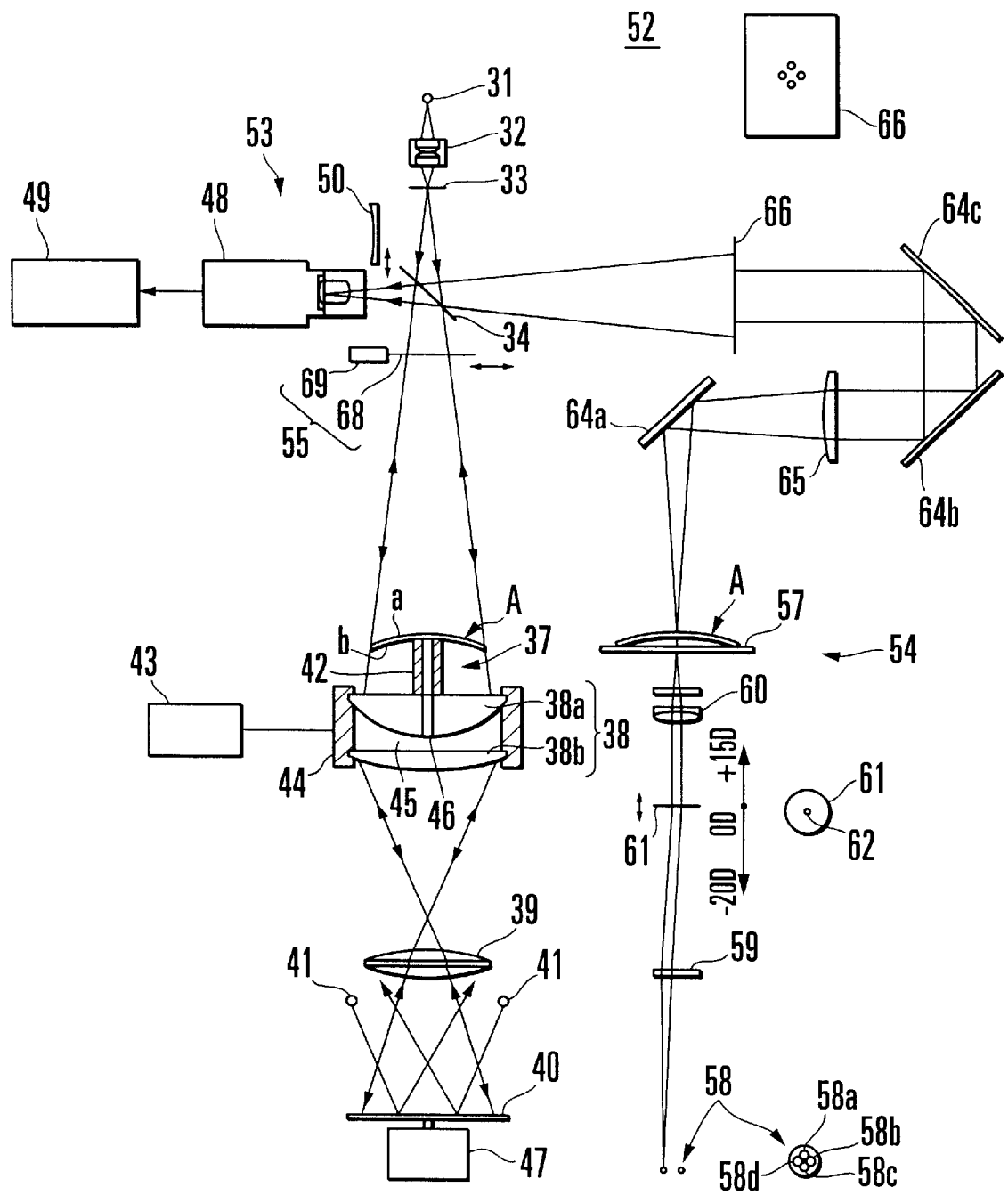
FIG. 3 is a schematic view showing a spectacle lens image sensing processing apparatus according to the second embodiment of the present invention.
Figure 4:
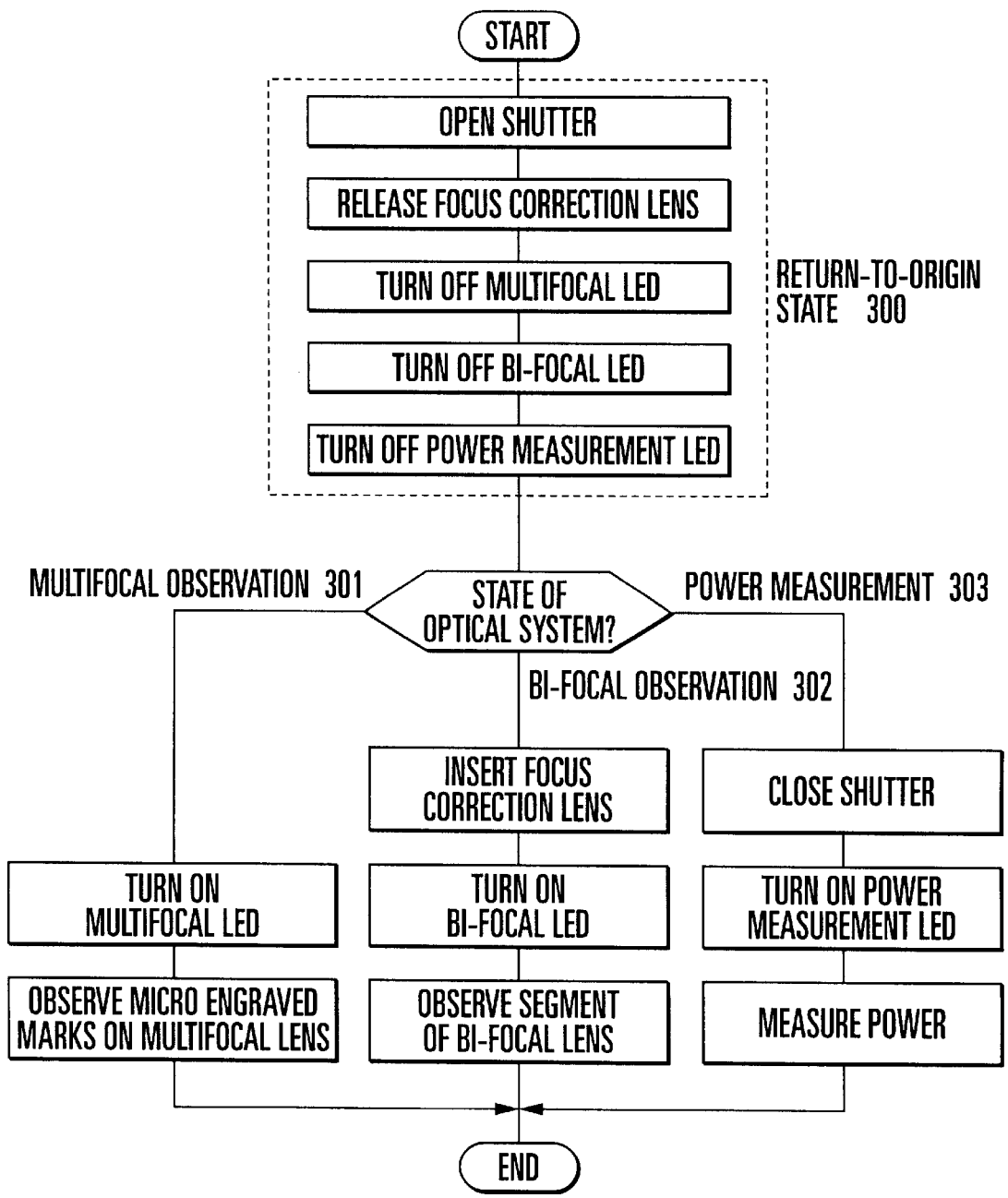
FIG. 4 is a flow chart showing operation in an optical system.

FIG. 3 shows the arrangement of a spectacle lens image sensing processing apparatus according to the second embodiment of the present invention. FIG. 4 shows operation in an optical system. The same reference numerals as in the first embodiment denote the same parts in the second embodiment, and a description thereof will be properly omitted. A spectacle lens image sensing processing apparatus (to be referred to as an image sensing processing apparatus hereinafter) 52 detects the optical characteristics (the positions of a geometrical center and eyepoint) of a progressive multifocal lens 1 and multifocal lens 13 by detecting marks and measures lens powers. This apparatus has a mark detector 53 and power measuring device 54 which are juxtaposed, and a switching means 55 for switching the two devices. An image sensing unit 48 and image processing unit 49 of the mark detector 53 are commonly used for the power measuring device 54.

The mark detector 53 is identical to the image sensing processing apparatus 30 shown in FIG. 1, and includes a progressive multifocal lens light source 31 for irradiating a lens A to be examined with light from the convex surface a side, a condenser lens 32, a stop 33, a half mirror 34, a lens holder 37 for chucking/fixing the lens A, a condenser lens 38, an imaging lens 39, a reflection screen 40, the image sensing unit 48, the image processing unit 49, a focus correction lens 50, and the like.

The power measuring device 54 includes a lens mount base 57 on which the lens A is mounted with a concave surface b facing down, a power measuring light source 58 for irradiating the lens A with light from the concave surface b side, a light-sending lens 59 for collimating light emitted from the light source 58, a collimator lens 60 for forming a light source image on the concave surface b of the lens A, and a target 61 that is placed between the collimator lens 60 and the light-sending lens 59 to be movable in the optical axis direction. The power measuring device 54 also includes three mirrors 64a, 64b, and 64c arranged on the convex surface a side of the lens A, an objective lens 65, and a transmission screen 66. In this embodiment, since the lens A is the progressive multifocal lens 1 or multifocal lens 13 described above, its distance power is measured by the power measuring device 54. The lens power measurement range of the power measuring device 54 is set to, for example, −20 D to +15 D.

As the lens mount base 57, a transparent glass plate is used. The light source 58 is constituted by four ultra-high-luminance light-emitting diodes (LEDs) 58a to 58d, which are arranged at the respective vertices of a square centered on the optical axis to facilitate arithmetic processing. Each of the LEDs 58a to 58d axis spaced apart from the optical axis by about 2 mm. The peak wavelength light emitted from each of the LEDs 58a to 58d is 715.2 nm.

As the target 61, a pinhole plate with a pinhole 62 formed in the center and having a diameter of about 1 mm is used. An image of the pinhole 62 is formed as a pattern image of the target 61 on the transmission screen 66 owing to the effects of the collimator lens 60 and objective lens 65.

The objective lens 65 is placed between the mirrors 64a and 64b. The transmission screen 66 is formed by a milky synthetic resin plate or ground glass and placed on the opposite side of the half mirror 34 of the mark detector 53 to the image sensing unit 48.

The switching means 55 is comprised of a shutter 68 and a driving unit 69 such an air cylinder for selectively inserting the shutter 68 in the optical path between the half mirror 34 and the lens holder 37. When the lens A is the progressive multifocal lens 1 and its micro engraved marks 3A, 3B, and 3C or the like are to be detected, or when the lens A is the multifocal lens 13 and an upper rim 17 of a segment 13B is to be detected, the shutter 68 is retracted from the optical path by the driving unit 69. When a lens power is to be measured, the shutter 68 is inserted into the optical path. This arrangement prevents external light from the mark detector 53 from entering the image sensing unit 48 through the half mirror 34 during measurement of a lens power.

In this image sensing processing apparatus 52, before mark detection or lens power measurement is performed, a return-to-origin state 300 is held as shown in FIG. 4. In this return-to-origin state 300, the focus correction lens 50 and switching means 55 are retracted from the optical path of the mark detector 53. In addition, all the light sources 31, 41, and 58 are kept off.

When the lens A is the progressive multifocal lens 1 or multifocal lens 13 and its optical characteristics are to be detected, the same operation as that in the first embodiment is performed by the mark detector 53. More specifically, when the lens A is the progressive multifocal lens 1, the progressive multifocal lens light source 31 is turned on, and mark detection is performed while the focus correction lens 50 and switching means 55 are retracted from the optical path of the mark detector 53 (step 301 in FIG. 4). During this operation, the multifocal lens light source 41 and power measurement light source 58 are kept off. When the lens A is the multifocal lens 13, the multifocal lens light source 41 is turned on, and the segment is detected (step 302 in FIG. 4) while the focus correction lens 50 is inserted in the optical path and the switching means 55 is retracted from the optical path. During this operation, the progressive multifocal lens light source 31 and power measurement light source 58 are kept off.

When the lens A is the progressive multifocal lens 1 or multifocal lens 13 and its lens power is to be measured, the focus correction lens 50 is retracted from the optical path of the mark detector 53, and the switching means 55 is inserted in the optical path (step 303 in FIG. 4). When the transmission screen 66 is illuminated by the light source (light source image), the light emitted from the light source 58 is collimated by the light-sending lens 59 and illuminates the pinhole plate 61. This light reaches the collimator lens 60. The light is then focused at the position of the concave surface b of the lens A by the collimator lens 60 to form a light source image. This light beam becomes divergent light again and reaches the objective lens 65 to illuminate the transmission screen 66. When the pinhole image 62 of the pinhole plate 61 is formed on the transmission screen 66, and the lens to be examined has no power (0.00 D), the pinhole image 62 of the target 61 is collimated by the collimator lens 60, and the pinhole image is formed on the transmission screen 66 owing to the effect of the objective lens 65. That is, when the LEDs 58a to 58d are sequentially turned on while the lens A is not placed on the lens mount base 57, the light passes through the pinhole 62 of the pinhole plate 61, collimator lens 60, mirror 64a, and objective lens 65, mirror 64b, and mirror 64c to project the pinhole image on the transmission screen 66. At this time, the pinhole plate 61 is held at a reference position to form a pinhole image at substantially the same position when the LEDs 58a to 58d are turned on one by one. The pinhole image projected on the transmission screen 66 is transmitted through the transmission screen 66 and sensed by the image sensing unit 48. This pinhole image is then input to the image processing unit 49 to be subjected to image processing to calculate the position of the pinhole image. This position is stored as a reference position. Note that when a lens to be examined is placed and the LEDs 58a to 58d are sequentially turned on one by one, a pinhole image is not formed at substantially the same position on the transmission screen 66. For this reason, the pinhole plate 61 is moved/adjusted in the optical axis direction to form a pinhole image at substantially the same position as in the case of a general lens meter.

When the lens A is to be measured, the lens is mounted on the lens mount base 57, and the LEDs 58a to 58d are sequentially turned on one by one. In this case, since light beams from the LEDs 58a to 58d are transmitted through the lens A, the positions of the pinhole images from the respective LEDs which are projected on the transmission screen 66 are displaced from the above reference position owing to a prism effect corresponding to the lens power of the lens A (optical characteristic). The image sensing unit 48 senses these pinhole images. The image processing unit 49 then performs image processing to calculate the displacement amounts of pinhole images from the respective LEDs 58a to 58d. More specifically, the pinhole plate 61 is moved/adjusted to form the pinhole images at substantially the same position on the subtraction unit 66. The movement amounts of the pinhole plate 61 in this case are stored in the image processing unit 49. The lens power of the lens A is then calculated by converting the displacement amounts of the pinhole images and the movement amounts of the pinhole plate 61 into a power. Note that the basic optical power calculation method is the same as that disclosed in Japanese Patent Laid-Open No. 2-2164428 filed by the present applicant.

Since this image sensing processing apparatus 52 has the mark detector 53 and power measuring device 54, detection of the geometrical center, eyepoint position, and the like of the lens A and measurement of a lens power can be continuously performed by conveying the lens A from the lens holder 37 to the lens mount base 57 (or in the reverse direction) using a proper lens convey mechanism. In addition, since the image sensing unit 48 and image processing unit 49 of the mark detector 53 are commonly used for the power measuring device 54, the image sensing processing apparatus 52 can be simplified and reduced in cost.

This embodiment has exemplified the power measuring device 54 which uses the pinhole plate as the target 61 and measures a lens power by measuring the displacement amount of each pinhole image. However, the present invention is not limited to this. Various conventional power measuring methods can be used. For example, the power measuring method disclosed in Japanese Patent Publication No. 8-20334 described above may be used. In addition, the lens holder 37 is not limited to the one designed to vacuum-chuck, and may be a glass plate like the lens mount base 57 of the power measuring device 54, on which a lens to be examined is mounted.

This embodiment includes the mark detector 53 for detecting micro engraved marks by sensing an image of the convex surface of the lens A and performing image processing, the power measuring device 54 for measuring the lens power of the lens A, and the switching means 55 which is retractably placed with respect to the mark detector 53 to switch between mark detection and power measurement. With this arrangement, mark detection and power measurement can be continuously performed. In addition, since the image sensing unit 48 and image processing unit 49 of the mark detector 53 are commonly used for the power measuring device 54, the apparatus can be simplified and reduced in cost.

Third Embodiment

Figure 5:
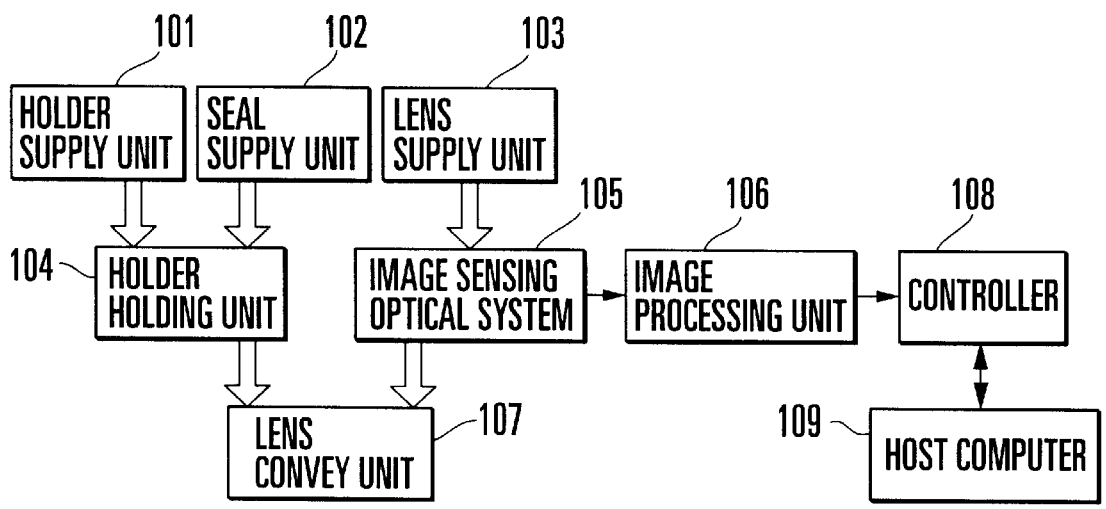
FIG. 5 is a block diagram showing the arrangement of a progressive multifocal lens image sensing processing apparatus according to the third embodiment of the present invention.

FIG. 5 shows the arrangement of a progressive multifocal lens image sensing processing apparatus according to the third embodiment of the present invention. The progressive multifocal lens image sensing processing apparatus forms a layout blocker, and is juxtaposed with an edger (not shown). This apparatus image-senses a progressive multifocal lens 1 and determines, on the basis of the sensed image, whether the lens is a left- or right-eye lens. At the same time, the apparatus performs layout processing to calculate the mounting position and angle of a processing jig (lens holder) mounted on the progressive multifocal lens 1 and blocking to mount the lens holder at the processing center of the progressive multifocal lens 1, and conveys the progressive multifocal lens 1 to the edger after the lens holder is mounted on the lens.

This image sensing processing apparatus includes a holder supply unit 101 for supplying a lens holder, a seal supply unit 102 for supplying an elastic seal (to be described later), a lens supply unit 103 for supplying the progressive multifocal lens 1 to be processed, a holder holding unit 104 for mounting the lens holder, supplied by the holder supply unit 101, at the processing center of the progressive multifocal lens 1, an image sensing optical system 105 for image-sensing the progressive multifocal lens 1, an image processing unit 106 for determining, on the basis of the image sensed by the image sensing optical system 105, whether the progressive multifocal lens 1 is a left- or right-eye lens, and calculating the mounting position and angle of the lens holder, a lens convey unit 107 for conveying the progressive multifocal lens 1 to the edger after the lens holder is mounted on the lens, a controller 108 for controlling the overall image sensing processing apparatus, and a host computer 109 serving as a computation means for controlling the image sensing processing apparatus and edger.

Figure 6:
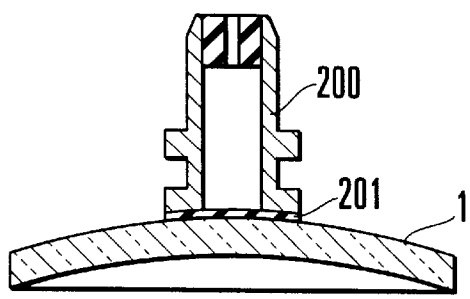
FIG. 6 is a side view showing a state in which a lens holder is mounted on a progressive multifocal lens through an elastic seal.

FIG. 6 shows a state in which the lens holder is mounted on the progressive multifocal lens 1 through an elastic seal on the basis of the image processing result obtained by the image processing unit 106. A lens holder 200 made of a metal such as stainless steel is molded into a collared cylindrical member. The surface of the lens holder 200 to which an elastic seal 201 is bonded (the lower surface of the lens holder 200) serves as a concave lens holding surface conforming to the convex lens surface of the progressive multifocal lens 1.

If a lens holding surface conforming to the convex surface curve of each lens is formed, the number of types of lens holders 200 increases. In this case, therefore, the radius of curvature of a lens holding surface is changed stepwise to decrease the number of types of lens holders 200, thus allowing one type of lens holder 200 to hold several types of progressive multifocal lenses 1 having different convex surface curves.

The elastic seal 201 is formed into a ring-like shape having an outer diameter (about 22 mm) larger than the outer diameter of the lens holding surface of the lens holder 200 and an inner diameter (about 8 mm) smaller than the hole diameter of the lens holder 200 by using a rubber material as thin as about 0.5 to 06 mm. The two surfaces of this seal are coated with an adhesive.

Figure 7:
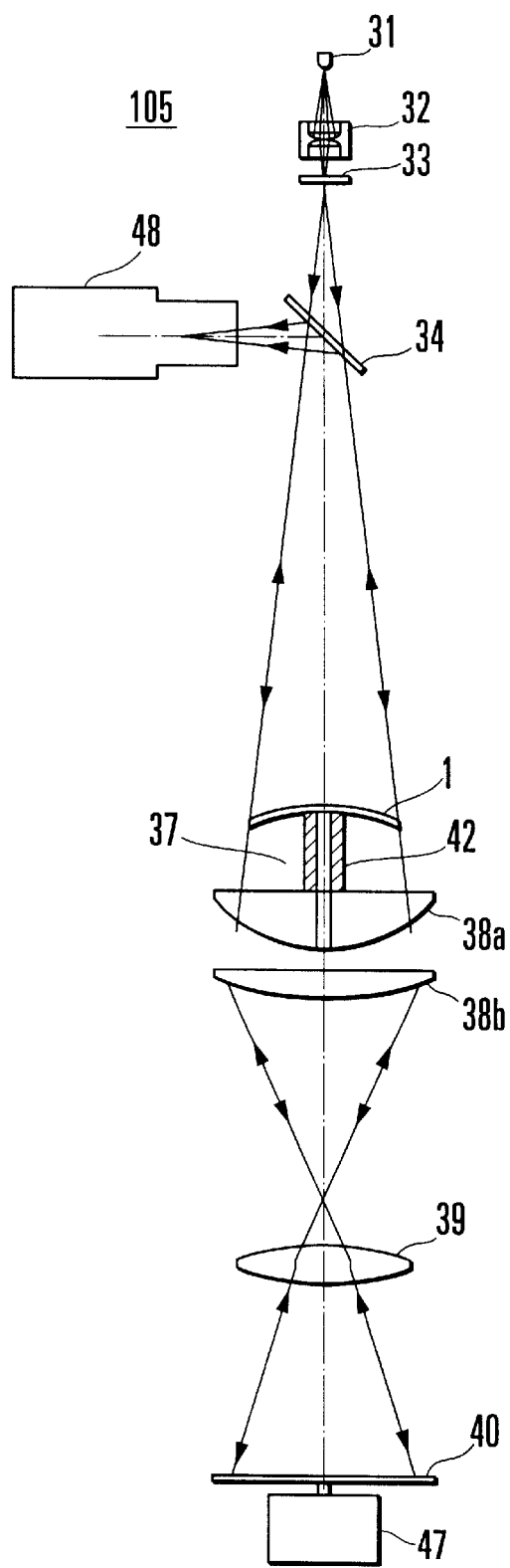
FIG. 7 is a block diagram showing the arrangement of an image sensing optical system in the third embodiment of the present invention.

FIG. 7 shows the arrangement of the image sensing optical system 105. The same reference numerals as in FIG. 1 denote the same parts in FIG. 7. The image sensing optical system 105 is equivalent to the image sensing processing apparatus 30 in FIG. 1 from which the image processing unit 49 is omitted, and hence may use the arrangement of the image sensing processing apparatus 30. However, FIG. 7 shows the arrangement specifically designed for a progressive multifocal lens. The image sensing optical system 105 includes a light source 31, condenser lens 32, stop 33, half mirror 34, lens holder 37, convex lenses 38a and 38b serving as condenser lenses, imaging lens 39, reflection screen 40, motor 47, and image sensing unit 48 such as a CCD camera.

Figure 8:
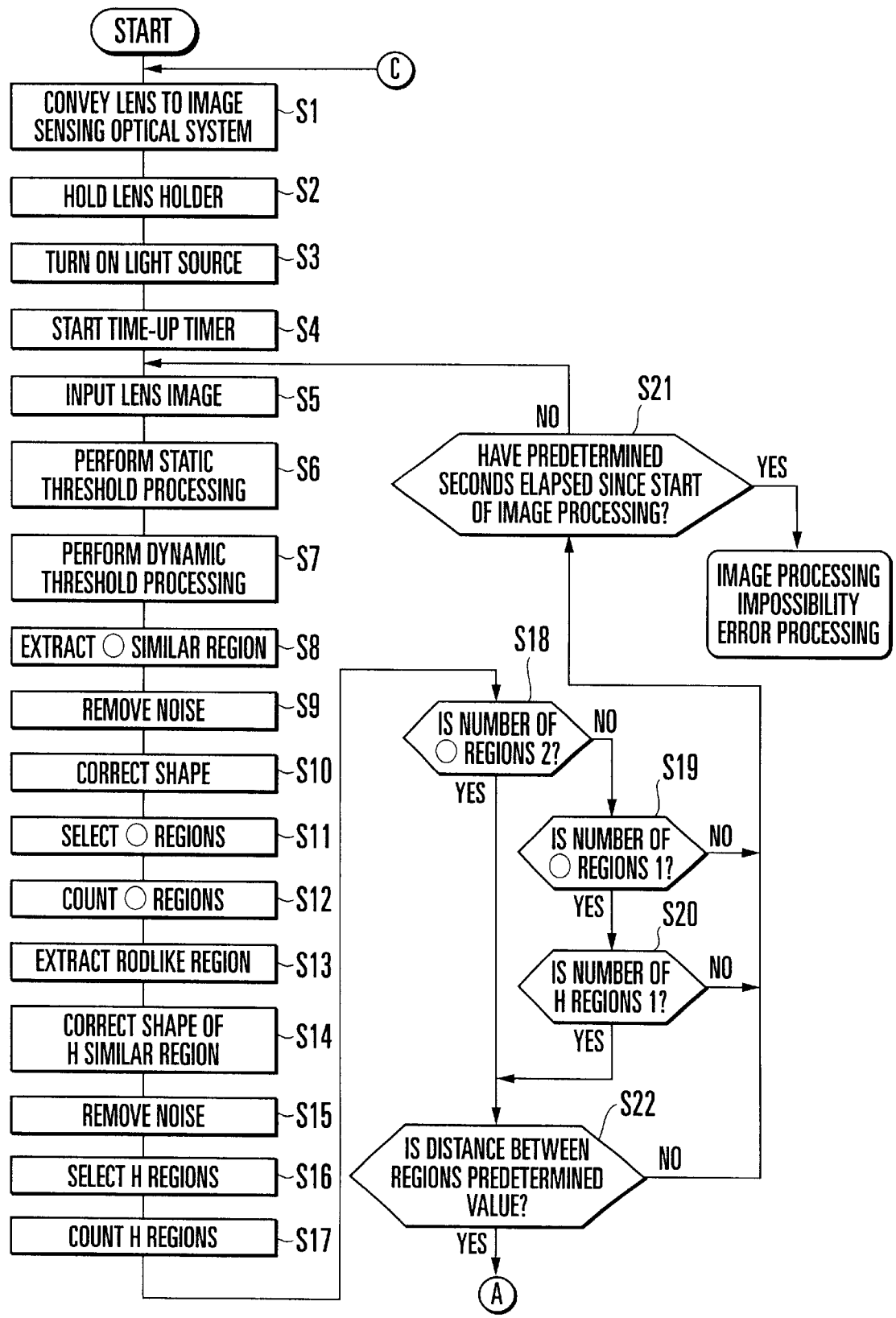
FIG. 8 is a flow chart showing the operation of the image sensing processing apparatus according to the third embodiment of the present invention.
Figure 9:
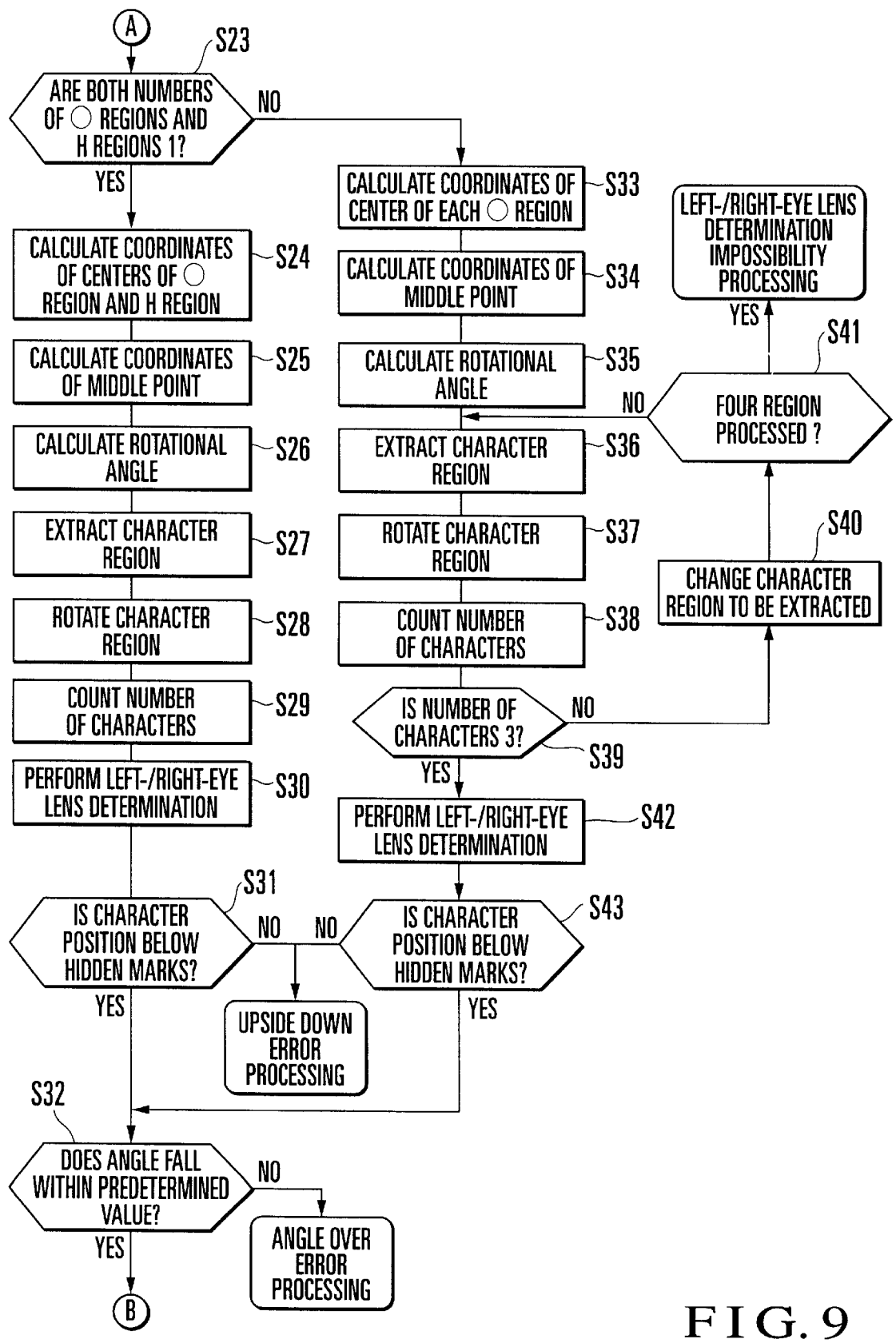
FIG. 9 is a flow chart showing the operation of the image sensing processing apparatus according to the third embodiment of the present invention.
Figure 10:
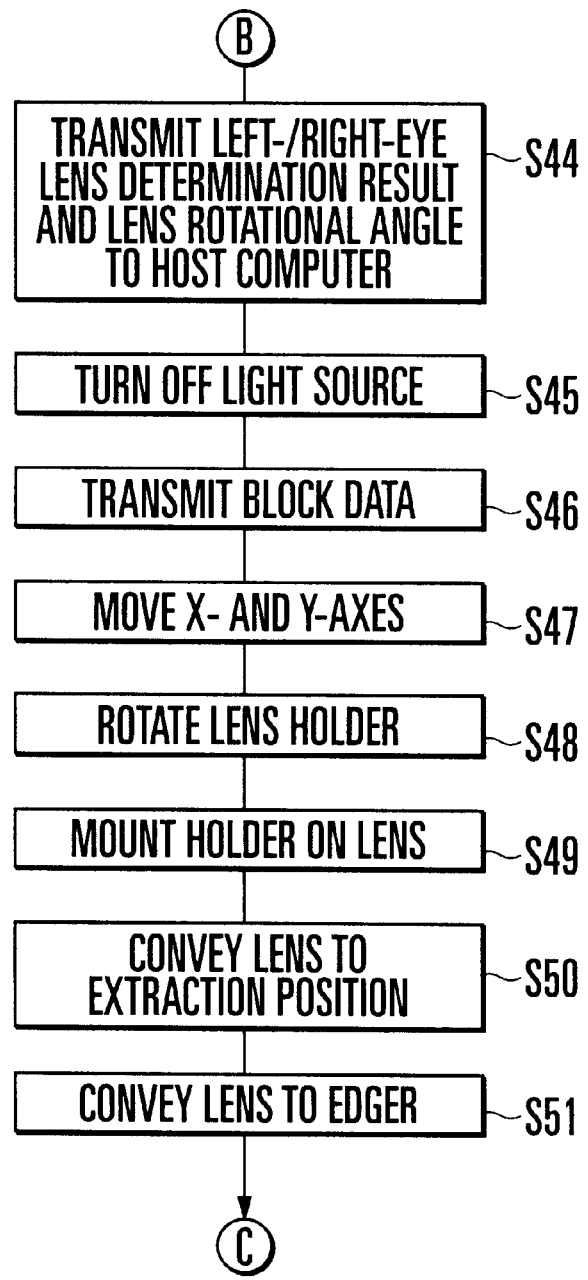
FIG. 10 is a flow chart showing the operation of the image sensing processing apparatus according to the third embodiment of the present invention.

FIGS. 8 to 10 show the operation of the image sensing processing apparatus in FIG. 5. The operation of the image sensing processing apparatus will be described below with reference to FIGS. 8 to 10. First of all, the lens supply unit 103 places one progressive multifocal lens 1 to be edged (to be referred to as a processing target lens 1 hereinafter) on the lens holder 37 of the image sensing optical system 105 with the convex surface of the lens facing up. The lens holder 37 chucks/fixes the processing target lens 1 on the opening portion of the upper surface of a lens support cylinder 42 by evacuating the interior of the lens support cylinder 42 (step S1 in FIG. 8).

The holder supply unit 101 supplies the lens holders 200 one by one to the holder holding unit 104 under the control of the controller 108.

The elastic seal 201 is loaded in the form of a roll in the seal supply unit 102. The surface of this roll is covered with a protective sheet. The seal supply unit 102 supplies the elastic seals 201 one by one to the holder holding unit 104 with the protective sheets peeling off.

Upon reception of the lens holder 200 and elastic seal 201, the holder holding unit 104 holds the lens holder 200 and bonds the elastic seal 201 to the lens holding surface of the lens holder 200. The holder holding unit 104 is then set in a standby state to prepare for mounting of the lens holder 200 on the processing target lens 1 (step S2).

The controller 108 then turns on the light source 31 of the image sensing optical system 105 (step S3). Subsequently, the image processing unit 106 resets a time-up timer for image processing to 0 and starts it in accordance with an instruction from the controller 108, thus starting time measurement (step S4). This time-up timer is used to measure the elapsed time in image processing for one processing target lens 1.

Illumination light from the light source 31 passes through the condenser lens 32, stop 33, and half mirror 34 and strikes the processing target lens 1. With this operation, an image of micro engraved marks 3A and 3B, numeral 4, and identification mark 5 formed on the surface of the processing target lens 1 is focused by the convex lenses 38a and 38b and projected on the reflection screen 40 through the imaging lens 39. The image projected on the reflection screen 40 passes through the imaging lens 39 and convex lenses 38b and 38a and is reflected by the half mirror 34 to be projected on the light-receiving surface of the image sensing unit 48. The image sensing unit 48 photoelectrically converts the image projected on the light-receiving surface into an image signal and outputs it.

The image processing unit 106 A/D-converts the image signal output from the image sensing unit 48 of the image sensing optical system 105 and temporarily stores the image data obtained by A/D conversion in the internal memory (step S5).

Subsequently, the image processing unit 106 starts image processing for the input image stored in the memory. FIGS. 11A to 12B show how image processing is performed by the image processing unit 106. First of all, the image processing unit 106 compares the input image shown in FIG. 11A with a predetermined first threshold, and extracts pixels whose luminance values are equal to or more than the first threshold from the image without any change. The image processing unit 106 performs static threshold processing for pixels whose luminance values are less than the first threshold to set the luminance values to 0, thereby removing the background area from the input image and extracting a lens area. The image processing unit 106 stores this lens area in the memory (step S6).

The image processing unit 106 calculates the difference between the blurred image obtained by smoothing the image stored in the memory, which has undergone the static threshold processing, and the image having undergone the static threshold processing for each pixel, and performs dynamic threshold processing to assign "1" to each pixel corresponding to the calculated difference equal to or more than a predetermined second threshold and assign "0" to each pixel corresponding to the calculated difference less than the second threshold, thereby binarizing the image having undergone the static threshold processing (step S7).

In this dynamic threshold processing, the contours are sharpened by difference processing, and "1" is assigned to each portion exhibiting a large difference output, i.e., each portion that is likely to be a contour portion of an object, while "0" is assigned to each of the remaining portions. Even if, therefore, slight illumination irregularity or halation occurs in image-sensing the processing target lens 1, the shapes of the micro engraved marks 3A and 3B, numeral 4, and identification mark 5 can be extracted. With this dynamic threshold processing, an image like the one shown in FIG. 11B can be obtained. The image processing unit 106 stores the image having undergone the dynamic threshold processing in the memory.

The binarized image contains dust, dirt, and the like on the surface of the processing target lens 1, and the binarized micro engraved marks are often partly omitted. For this reason, the micro engraved marks 3A and 3B cannot be directly detected from the binarized image obtained by dynamic threshold processing. Therefore, the micro engraved marks 3A and 3B are detected by, for example, removing noise components or repairing the omitted portions of the micro engraved marks 3A and 3B.

The image processing unit 106 performs labeling processing in which a set of concatenated pixels "1" in the binarized image having undergone dynamic threshold processing is regarded as one concatenation component, and the same label (number or name) is assigned to each pixel within the same concatenation component. The image processing unit 106 then extracts geometrical feature parameters from the respective concatenation components and stores them in the memory. In this case, as feature parameters of each concatenation component, the image processing unit 106 extracts an area S of the concatenation component (the number of pixels of the concatenation component) shown in FIG. 11C and the ratio (L1/L2) of a major axis L1 to a minor axis L2. Each of FIGS. 11C to 11I shows a pixel-"1" region by hatching.

The image processing unit 106 extracts a concatenation component whose area S falls within a predetermined first area range and ratio of the major axis L1 to the minor axis L2 is equal to or less than a predetermined ratio threshold (e.g., 1.2) as a circular micro engraved mark candidate region (to be referred to as a ○ similar region hereinafter), and stores the position of this extracted ○ similar region in the memory (step S8). In this manner, for example, a ○ similar region like the one shown in FIG. 11D can be extracted.

This ○ similar region contains projection-like noise components. For this reason, the image processing unit 106 compresses the extracted ○ similar region by a predetermined number of pixels first, and then decompresses the region by the same number of pixels. When the ○ similar region is compressed, the projection-like noise components disappear. If, therefore, the compressed ○ similar region is decompressed, the projection-like noise components can be removed from the ○ similar region (step S9).

The reflecting surface also contains noise components such as holes and omissions. For this reason, the image processing unit 106 expands the ○ similar region, from which projection-like noise components have been removed, by a predetermined number of pixels to remove noise components such as holes and omissions from the ○ similar region, thus performing shape correction (step S10). As a consequence, a ○ similar region having undergone shape correction like the one shown in FIG. 11E can be obtained.

The image processing unit 106 then fills the inside of each ○ similar region having undergone shape correction with pixels "1" as shown in FIG. 11F, extracts geometrical feature parameters of each ○ similar region, and stores them in the memory. In this case as well, as the feature parameters, the area S of each ○ similar region and the ratio of the major axis L1 to the minor axis L2 are extracted.

The image processing unit 106 extracts a ○ similar region whose area S falls within a predetermined second area range and ratio of the major axis L2 to the minor axis L2 is equal to or less than the above ratio threshold as a most promising candidate area (to be referred to as a ○ region hereinafter) for a circular micro engraved mark, and stores the extracted ○ region in the memory (step S11). The image processing unit 106 counts the number of extracted ○ regions and stores the count in the memory (step S12).

Subsequently, the image processing unit 106 performs labeling processing for the binarized image having undergone the dynamic threshold processing, extracts geometrical feature parameters of each concatenation component, and stores them in the memory. In this case, as feature parameters of each concatenation component, the area S, major axis L1, and minor axis L2 of each concatenation component are extracted.

The image processing unit 106 extracts a rodlike concatenation component whose area S falls within a predetermined third area range, major axis L1 falls within a predetermined major axis range, and minor axis L2 falls within a predetermined minor axis range as a region that is likely to be a constituent element of an H-shaped micro engraved mark, and stores the position of the rodlike concatenation component extracted in this manner in the memory (step S13). In this manner, for example, regions like those shown in FIG. 11G can be extracted.

The three rodlike regions shown in FIG. 11G constitute a shape similar the letter "H", but are not concatenated with each other. The image processing unit 106 therefore expands the extracted rodlike regions by a predetermined number of pixels (e.g., about two pixels) to concatenate these regions, thereby obtaining a candidate region for an H-shaped micro engraved mark (to be referred to as an H similar region hereinafter) (step S14). With this operation, an H similar region having undergone shape correction like the one shown in FIG. 11H can be obtained.

Subsequently, the image processing unit 106 compresses the H similar region having undergone shape correction by a predetermined number of pixels first, and then decompresses it by the same number of pixels, thereby removing projection-like noise components from the H similar region (step S15). The image processing unit 106 extracts geometrical feature parameters from the H similar region from which noise components have been removed, and stores them in the memory. In this case, as the feature parameters of the H similar region, the image processing unit 106 extracts the ratio (HT/W) of a height HT to a width W of the H similar region shown in FIG. 11I, the convexity (the degree indicating how the graphic pattern is dented on a two-dimensional plane), a diameter D of a circle circumscribing the H similar region, and the distance from the above ○ region. The convexity becomes less than 1 if there are recesses and holes in the circle.

The image processing unit 106 extracts an H similar region whose ratio of the height HT to the width W falls within a predetermined ratio range, convexity falls within a predetermined range (e.g., 0.6 to 0.7), diameter D of the circumscribed circle falls within a predetermined diameter range, and distance from the ○ region falls within a predetermined distance range as a most promising candidate region (to be referred to as an H region hereinafter) for an H-shaped micro engraved mark, and stores the position of the extracted H region in the memory (step S16). The image processing unit 106 then counts the number of H regions extracted and stores the count in the memory (step S17).

The image processing unit 106 checks whether the number of ○ regions counted in step S12 is 2 (step S18). If the number of ○ regions is not 2, the image processing unit 106 checks whether the number of ○ regions is 1 (step S19). If the number of ○ regions is 1, the image processing unit 106 checks whether the number of H regions counted in step S17 is 1 (step S20). If the number of ○ region is neither 2 nor 1, the image processing unit 106 checks whether the elapsed time measured by the time-up timer exceeds a predetermined sec (e.g., 4 sec) (step S21).

If the elapsed time does not exceed the predetermined sec, the image processing unit 106 executes the processing in steps S5 to S20 again. In this manner, if the number of ○ regions is neither 2 nor 1 or the number of ○ regions is 1 and the number of H regions is not 1 (i.e., a portion other than the micro engraved marks 3A and 3B is detected), and the elapsed time does not exceed the predetermined seconds, the image processing unit 106 executes the processing in steps S5 to S20 again.

It is determined in step S21 that the elapsed time exceeds the predetermined seconds, the image processing unit 106 determines that the micro engraved marks 3A and 3B cannot be detected by image processing, and performs image processing impossibility error processing to notify the controller 108 of the impossibility of image processing. Upon reception of the notification, the controller 108 performs processing, e.g., removing the processing target lens 1 suffering the image processing impossibility error from the image sensing processing apparatus.

If the number of ○ regions is 2 or the numbers of ○ regions and H regions both are 1, the image processing unit 106 obtains the distance between the two ○ regions or the distance between the ○ region and H region, and checks whether the distance falls within a predetermined range centered on a predetermined value (e.g., 34 mm) (step S22). If the obtained distance falls outside the predetermined range centered on the predetermined value, the flow advances to step S21.

If the obtained distance falls within the predetermined range centered on the predetermined value, and the numbers of ○ regions and H regions both are 1 (YES in step S23 in FIG. 9), the image processing unit 106 sets the center of the minimum circumscribed circle of the ○ region as the center of the ○ region and the center of the minimum circumscribed circle of the H region as the center of the H region, calculates the coordinates of the centers of the ○ region and H region, and stores them in the memory (step S24).

Figure 12A:
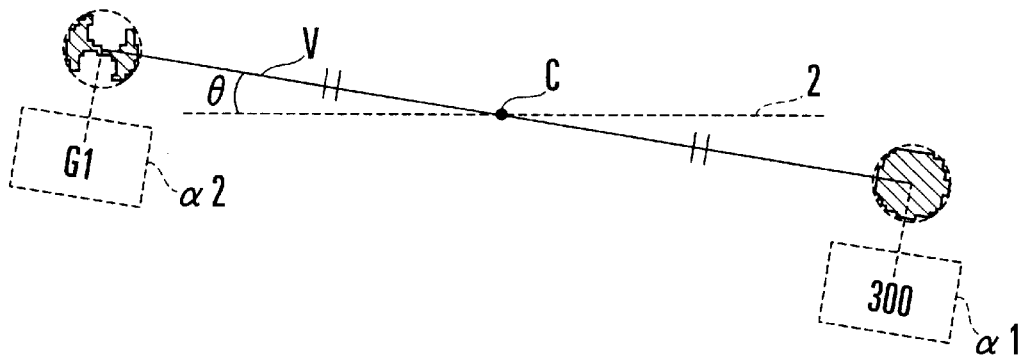
FIGS. 12A and 12B are views for explaining how image processing is performed by the image processing unit in the third embodiment of the present invention.

The image processing unit 106 then calculates the coordinates of a middle point (reference position) C between the center of the ○ region and the center of the H region as shown in FIG. 12A, and stores it in the memory (step S25). The image processing unit 106 further obtains a line segment connecting the center of the ○ region and the center of the H region (a vector extending from the ○ region to the H region) V, calculates an angle defined by the vector V and a horizontal reference line 2 of the image sensing processing apparatus (the rotational angle of the processing target lens 1 with respect to the horizontal reference line 2) θ, and stores it in the memory (step S26). When the processing target lens 1 is supplied to the image sensing processing apparatus, an angular deviation is caused with respect to a right position on the apparatus. The processing in step S26 is performed to obtain this angular deviation.

The image processing unit 106 extracts two rectangular regions α1 and α2, each having a predetermined size, from the binarized image having undergone the above dynamic threshold processing, which are located on either of the left and right sides (the left side in this embodiment) when the ○ region is viewed from the H region, and are respectively spaced apart from the centers of the ○ region and H region by a predetermined distance in a direction perpendicular to the vector V (step S27).

Since the two extracted rectangular regions α1 and α2 tilt the above rotational angle θ, the image processing unit 106 rotates the rectangular regions α1 and α2 through the rotational angle θ to make them parallel to the horizontal reference line 2 (step S28). The rectangular regions α1 and α2 are rotated to facilitate extraction of characters in the next character counting processing.

The image processing unit 106 counts the number of characters in the rectangular regions α1 and α2 by extracting characters in the rectangular regions α1 and α2 after the rotation processing one by one, and stores the count in the memory (step S29). The size and pitch of characters formed as the numeral 4 and identification mark 5 on the processing target lens 1 are known. The image processing unit 106 therefore compresses the images in the rectangular regions α1 and α2 in only the horizontal direction to remove noise components such as short circuits between the characters, and extracts the characters by using a pre-processing technique used in a character recognition technique. More specifically, the image processing unit 106 detects the spaces between periodic characters on the basis of the character pitch, and detects character regions on the basis of the character size, thereby determining character extraction positions.

Figure 12B:
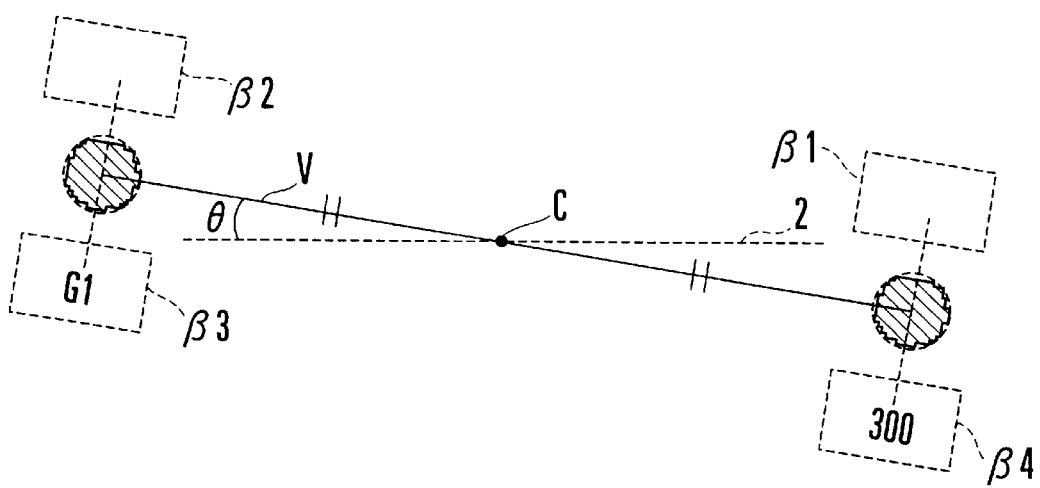

The image processing unit 106 then checks whether the processing target lens 1 is a right- or left-eye lens (step S30). On the progressive multifocal lens 1 on which the circular micro engraved mark 3A and H-shaped micro engraved mark 3B are formed in advance, the micro engraved mark 3A and numeral 4 representing the addition power are present on the ear side, and the micro engraved mark 3B and identification mark 5 representing the type of lens are present on the nose side. If, therefore, the numeral 4 and identification mark 5 are present on the right side when the H region is viewed from the ○ region, the lens 1 is a right-eye lens (FIG. 12B). If the numeral 4 and identification mark 5 are present on the left side, the lens 1 is a left-eye lens (FIG. 12A).

In this embodiment, the rectangular regions α1 and α2 located on the left side when the H region is viewed from the ○ region are extracted by the processing in step S27. If the number of characters counted in step S29 falls within a predetermined range (e.g., 3 (inclusive) to 7 (inclusive)), the image processing unit 106 determines that the lens is a left-eye lens. If the number of characters falls outside the predetermined range, the image processing unit 106 determines that the lens is a right-eye lens. If the lens is a right-eye lens, the number of characters in the rectangular regions α1 and α2 should be 0. If the lens is a left-eye lens, the number of characters should be 5. However, in consideration of character recognition errors, the image processing unit 106 determines that the lens is a left-eye lens, if the number of characters falls within a predetermined range.

Subsequently, the image processing unit 106 checks whether the numeral 4 and identification mark 5 are located below the micro engraved marks 3A and 3B (step S31). Assume that it is determined in step S30 that the lens is a right-eye lens. In this case, if the vector V is a rightward vector, the numeral 4 and identification mark 5 are located below the micro engraved marks 3A and 3B, whereas if the vector V is a leftward vector, they are located above the micro engraved marks 3A and 3B. Assume that it is determined that the lens is a left-eye lens. In this case, if the vector V is a leftward vector, the numeral 4 and identification mark 5 are located below the micro engraved marks 3A and 3B, whereas if the vector V is a rightward vector, they are located above the micro engraved marks 3A and 3B.

If the numeral 4 and identification mark 5 are located above the micro engraved marks 3A and 3B, the image processing unit 106 performs upside down error processing to notify the controller 108 that the processing target lens 1 is upside down and falls outside the allowable range of the image sensing processing apparatus. Upon reception of the notification, the controller 108 performs processing, e.g., removing the processing target lens 1 suffering the upside down error from the image sensing processing apparatus.

If the numeral 4 and identification mark 5 are located below the micro engraved marks 3A and 3B, the image processing unit 106 checks whether the rotational angle θ falls within a predetermined range (e.g., ±60°) (step S32). If the rotational angle θ falls outside the predetermined range, the image processing unit 106 performs angle over error processing to notify the controller 108 that the rotational angle of the processing target lens 1 falls outside the allowable range of the image sensing processing apparatus. Upon reception of the notification, the controller 108 performs processing, e.g., removing the processing target lens 1 suffering the angle over error from the image sensing processing apparatus.

If the image processing unit 106 determines that the rotational angle θ falls within the predetermined range, the flow advances to step S44 in FIG. 10.

If the distance obtained in step S22 falls within a predetermined range centered on a predetermined value, and the number of ○ regions is 2 (NO in step S23 in FIG.), the image processing unit 106 sets the centers of the minimum circumscribed circles of the respective regions as the centers of the respective ○ regions, calculates the coordinates of the centers of the two ○ regions, and stores them in the memory (step S33).

The image processing unit 106 then calculates the coordinates of the middle point C (geometrical center O) between the centers of the two ○ regions as shown in FIG. 12B and stores them in the memory (step S34). The image processing unit 106 also obtains the line segment V connecting the centers of the two ○ regions, calculates the angle (rotational angle) θ defined by this line segment V and the horizontal reference line 2, and stores it in the memory (step S35).

The image processing unit 106 extracts four rectangular regions β1 to β4, each having a predetermined size, from the binarized image having undergone the above dynamic threshold processing, which are spaced apart from the centers of the respective ○ regions by a predetermined distance in a direction perpendicular to the line segment V (step S36). The image processing unit 106 then rotates one of the extracted rectangular regions through the rotational angle θ to make it parallel to the horizontal reference line 2 (step S37).

The image processing unit 106 counts the number of characters in the rectangular region having undergone the rotation processing in the same manner as in step S29, and stores the count in the memory (step S38).

The image processing unit 106 checks whether the number of characters counted in step S38 is 3 (step S39). If the number of characters is not 3, the image processing unit 106 selects another region from the four rectangular regions β1 to β4 (steps S40 and S41), and performs the processing in steps S36 to S39.

If there is no region in which the number of characters is 3 after the numbers of characters in the four rectangular regions β1 to β4 are sequentially counted, the image processing unit 106 determines that it is impossible to determine whether the lens is a left- or right-eye lens, and performs left-/right-eye lens determination impossibility processing to determine on the basis of information notified in advance from the host computer 109 whether the processing target lens 1 is a right- or left-eye lens. The flow then advances to step S32.

If the number of characters is 3 in one of the rectangular regions β1 to β4, the image processing unit 106 determines that the processing target lens 1 is a right- or left-eye lens (step S42). On the progressive multifocal lens 1 on which the two circular micro engraved marks 3A and 3C are formed in advance, the 3-digit numeral 4 representing the addition power is present on the ear side, an the identification mark 5 representing the type of lens is present on the nose side. If, therefore, the rectangular region in which the number of characters is 3 is one of the rectangular regions β1 and β3 shown in FIG. 12B, the lens is a right-eye lens. If this region is one of the rectangular regions β2 and β4, the lens is a left-eye lens.

The image processing unit 106 then checks whether the numeral 4 and identification mark 5 are located below the micro engraved marks 3A and 3C (step S43). If the rectangular region in which the number of characters is 3 is one of the rectangular regions β3 and β4, the numeral 4 and identification mark 5 are located below the micro engraved marks 3A and 3C. If this region is one of the rectangular regions β1 and β2, the numeral 4 and identification mark 5 are located above the micro engraved marks 3A and 3C.

If the numeral 4 and identification mark 5 are located above the micro engraved marks 3A and 3C, the image processing unit 106 performs upside down error processing as described above.

If the numeral 4 and identification mark 5 are located below the micro engraved marks 3A and 3C, the image processing unit 106 performs the processing in step S32 described above.

In step S44, the image processing unit 106 sends the left-/right-eye lens determination result on the processing target lens 1, the calculated coordinates of the middle point C, and the calculated rotational angle θ to the controller 108. The controller 108 transmits the left-/right-eye lens determination result on the processing target lens 1 and rotational angle θ to the host computer 109. The controller 108 also turns on the light source 31 of the image sensing optical system 105 (step S45).

The host computer 109 has already recognized the processing target lens 1 as a right- or left-eye lens by reading a bar code stuck on the tray of the processing target lens 1 using a bar code reader when the lens was supplied to the image sensing processing apparatus. The host computer 109 can check whether the contents represented by the bar code coincide with the actual processing target lens 1 placed on the tray, by collating the result read from the bar code with the left-/right-eye lens determination result sent from the controller 108.

The host computer 109 performs angle correction with respect to the prestored layout data of the processing target lens 1 (the data representing the positional relationship between the geometrical center O, micro engraved marks 3A and 3B, and eyepoint 11) in accordance with the rotational angle θ, and then computes block data (data representing the position of the eyepoint 11 with reference to the geometrical center O) on the basis of the layout data having undergone the angle correction. The host computer 109 transmits the block data to the controller 108 (step S46).

The middle point C detected by the image processing unit 106 is the geometrical center O of the processing target lens 1. This middle point C deviates from the normal position on the image sensing processing apparatus due to the positional deviations caused in the horizontal direction (the lateral direction in FIGS. 12A and 12B) and vertical direction (the longitudinal direction in FIGS. 12A and 12B) when the lens was supplied. That is, the processing target lens 1 has undergone positional deviations in the horizontal and vertical directions. The block data has been calculated on the premise that the angular deviation of the processing target lens 1 has been corrected as described, and there are no positional deviations in the horizontal and vertical directions.

In conveying the processing target lens 1 from the image sensing optical system 105 to a predetermined lens holding position by using the lens supply unit 103, the controller 108 corrects the positional deviations of the processing target lens 1 in the horizontal and vertical directions on the basis of the coordinates of the middle point C, and then controls the lens supply unit 103 to position the eyepoint 11 of the processing target lens 1 immediately below the lens holder 200 held by the holder holding unit 104 on the basis of block data from the host computer 109 (step S47).

To correct the angular deviation caused when the processing target lens 1 is supplied, the controller 108 controls the holder holding unit 104 to rotate the lens holder 200 through the rotational angle θ to perform angle correction (step S48). The controller 108 then controls the holder holding unit 104 to lower the lens holder 200 so as to bring the elastic seal 201 stuck on the lens holder 200 into tight contact with the processing target lens 1. With this operation, as shown in FIG. 6, the lens holder 200 is mounted at the processing center (eyepoint 11) of the processing target lens 1 through the elastic seal 201 (step S49).

The controller 108 controls the holder holding unit 104 to convey the lens holder 200 to a predetermined extraction position, together with the processing target lens 1 (step S50), and then controls the lens convey unit 107 to convey the processing target lens 1 at the extraction position to the edger (step S51).

With the above operation, the processing performed by the image sensing processing apparatus for the processing target lens 1 is completed.

The processing target lens 1 conveyed to the edger is subjected to edging such as an arris process by the edger on the basis of the lens frame shape data and the prescription data of a wearer, thereby manufacturing a spectacle lens having a contour shape almost conforming to the shape of a frame.

According to this embodiment, an image of the processing target lens 1 is sensed and binarized. Geometrical feature parameters of each graphic pattern contained in the binarized image are extracted. Graphic patterns with these feature parameters satisfying predetermined conditions are extracted as images of the micro engraved marks 3A, 3B, and 3C formed on the processing target lens 1 in advance. The reference position (geometrical center) C or O having a predetermined positional relationship with the processing center position 11 is obtained on the binarized image on the basis of the positions of the extracted micro engraved marks. Since positional definitions common to all processing target lenses 1 are set between the micro engraved marks 3A, 3B, and 3C and the reference position O, the reference position of the processing target lens 1 can be obtained by detecting the micro engraved marks 3A, 3B, and 3C by image processing. The relationship between the reference position O and the processing center position 11 changes depending on the spectacle lens to be processed.

According to this embodiment, the time required to detect the micro engraved marks 3A, 3B, and 3C can be shortened as compared with the conventional method using template matching. In addition, since there is no need to use the magnifying optical system required for template matching, the cost can be reduced. Furthermore, the spectacle lens 1 and lens holder 200 can be positioned with higher precision than in the case where they are positioned manually by an operator. The burden imposed on the operator can greatly be reduced. As a consequence, the spectacle lens 1 and lens holder 200 can be accurately and efficiently positioned in a short period of time.

By obtaining the angular deviation θ with respect to the normal position of the spectacle lens 1 on the basis of the positions of the micro engraved marks 3A, 3B, and 3C, the processing center position 11 of the spectacle lens 1 can be obtained upon angle correction. In addition, processing for the spectacle lens 1 suffering a considerable angular deviation can be stopped.

The numeral 4 representing the addition power which is formed on the spectacle lens 1 in advance is detected on the binarized image on the basis of the positions of the micro engraved marks 3A, 3B, and 3C to check on the basis of the position of the detected numeral whether the spectacle lens 1 is a right- or left-eye lens. This makes it possible to check whether the spectacle lens 1 different from a desired lens is supplied by mistake. If it is determined that the spectacle lens 1 is supplied by mistake, the processing for the spectacle lens 1 can be stopped.

The numeral 4 representing the addition power which is formed on the spectacle lens 1 in advance is detected on the binarized image on the basis of the positions of the micro engraved marks 3A, 3B, and 3C to determine the vertical posture of the spectacle lens 1 on the basis of the position of the detected numeral 4. This makes it possible to stop the processing for the spectacle lens 1 supplied upside down.

Layout data representing the positional relationship between the reference position O and the processing center position 11 is stored in the host computer 109 serving as a computation means independent of the image processing unit 106. The host computer 109 is then made to calculate the processing center position 11 of the spectacle lens 1. This eliminates the necessity to hold a large volume of data in the image processing unit 106, and facilitates registration of layout data corresponding to the spectacle lens 1 to be processed.

Fourth Embodiment

A multifocal lens image sensing processing apparatus will be described next. When a multifocal lens layout blocker is to be implemented, the arrangement of an image sensing processing apparatus remains the same as that shown in FIG. 5. Hence, this apparatus will be described by using the same reference numerals as in FIG. 5.

Figure 13:
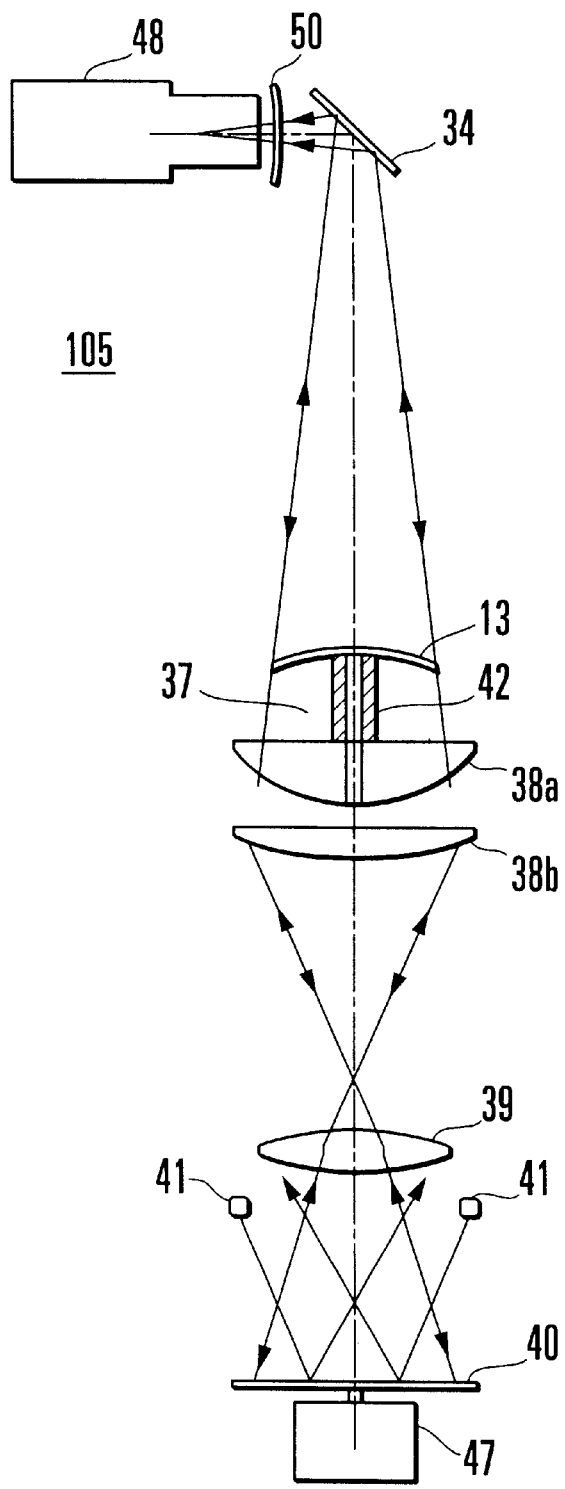
FIG. 13 is a block diagram showing the arrangement of an image sensing optical system in the fourth embodiment of the present invention.

FIG. 13 shows the arrangement of an image sensing optical system 105 for multifocal lenses. The same reference numerals as in FIG. 1 denote the same parts in FIG. 13. The image sensing optical system 105 is equivalent to the image sensing processing apparatus 30 shown in FIG. 1 from which the image processing unit 49 is omitted, and hence may use the arrangement of the image sensing processing apparatus 30. However, FIG. 13 shows the arrangement specifically designed for a multifocal lens. The image sensing optical system 105 includes a half mirror 34, lens holder 37, convex lenses 38b and 38a, imaging lens 39, reflection screen 40, light source 41, motor 47, image sensing unit 48, and focus correction lens 50.

Figure 14:
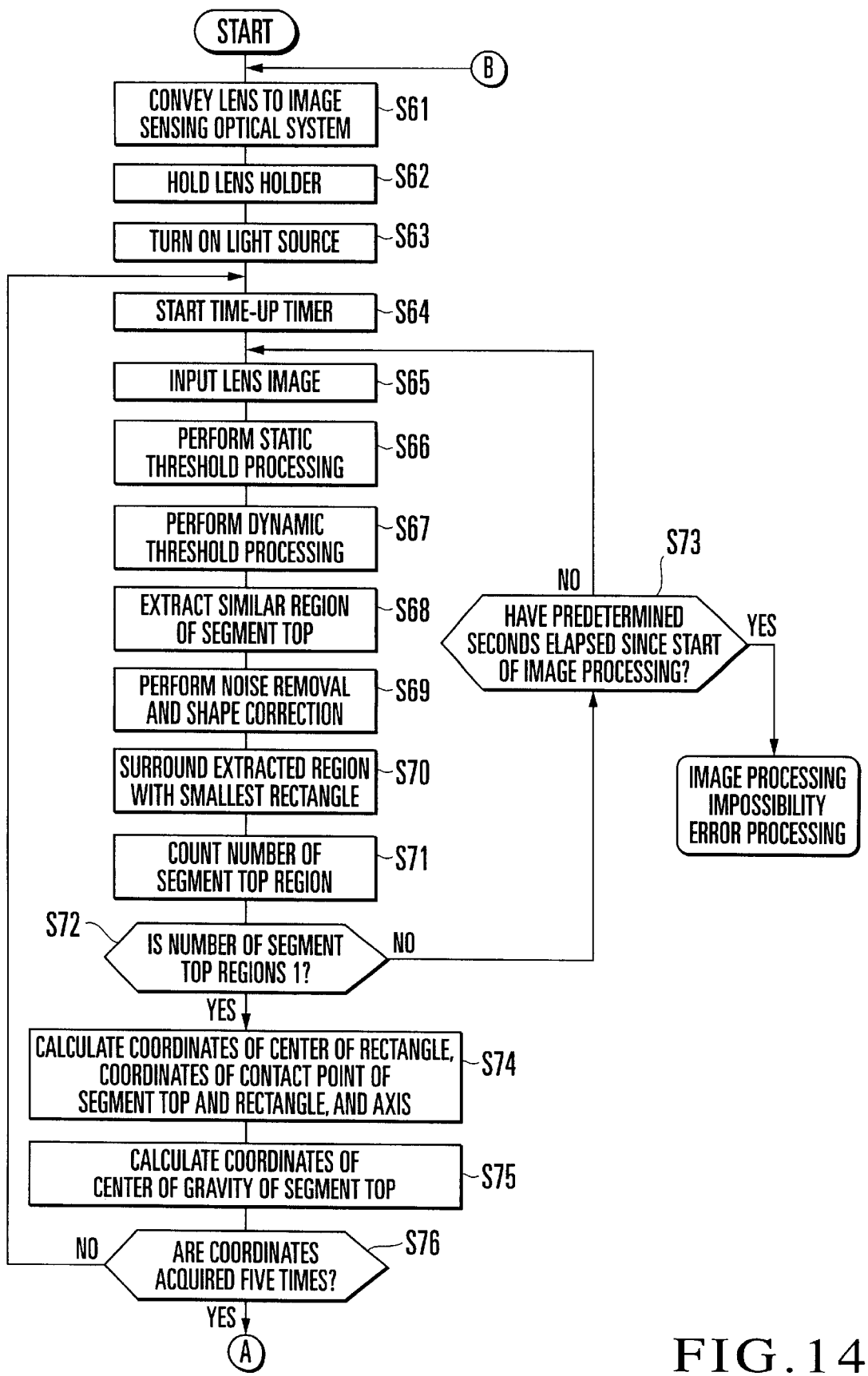
FIG. 14 is a flow chart showing the operation of an image sensing processing apparatus according to the fourth embodiment of the present invention.
Figure 15:
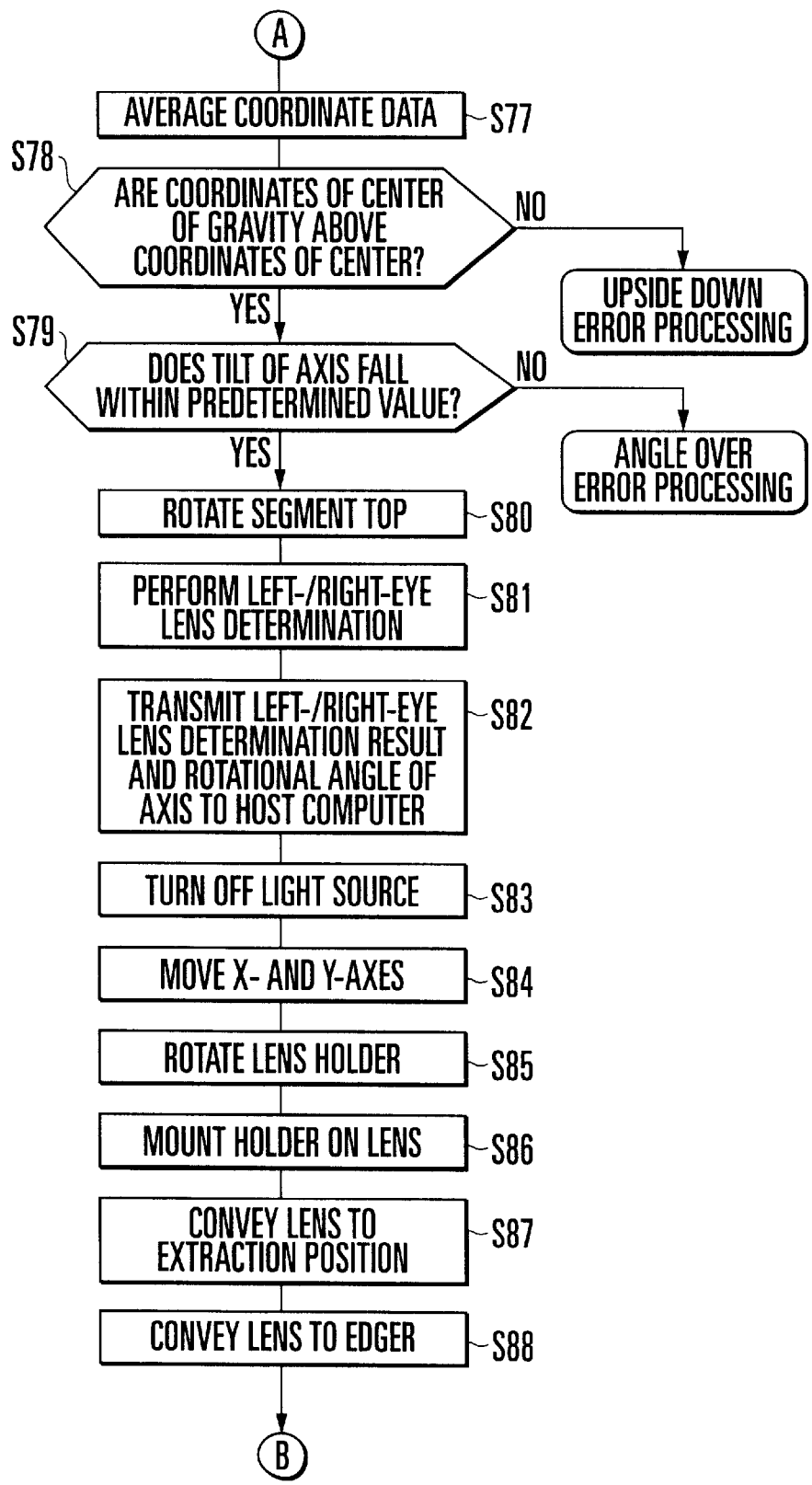
FIG. 15 is a flow chart showing the operation of an image sensing processing apparatus according to the fourth embodiment of the present invention.

FIGS. 14 and 15 show the operation of the image sensing processing apparatus according to this embodiment. The operation of the image sensing processing apparatus will be described in detail below with reference to FIGS. 14 and 15. First of all, a lens supply unit 103 places one multifocal lens 13 to be edged (to be referred to as a processing target lens 13 hereinafter) on a lens support cylinder 42 of the image sensing optical system 105 with the convex surface of the lens facing up under the control of a controller 108. The lens support cylinder 42 chucks/fixes the processing target lens 13 on the opening portion of the upper surface of the lens support cylinder 42 by evacuating the interior of the lens support cylinder 42 (step S61 in FIG. 14).

A holder supply unit 101 supplies lens holders 200 one by one to a holder holding unit 104 under the control of the controller 108.

Each elastic seal 201 is loaded in the form of a roll in a seal supply unit 102. The surface of this roll is covered with a protective sheet. The seal supply unit 102 supplies the elastic seals 201 one by one to the holder holding unit 104 with the protective sheets peeling off.

Upon reception of the lens holder 200 and elastic seal 201, the holder holding unit 104 holds the lens holder 200 and bonds the elastic seal 201 to the lens holding surface of the lens holder 200. The holder holding unit 104 is then set in a standby state to prepare for mounting of the lens holder 200 on the processing target lens 13 (step S62).

The controller 108 then turns on the light source 41 of the image sensing optical system 105 (step S63). Subsequently, an image processing unit 106 resets a time-up timer for image processing to 0 and starts it in accordance with an instruction from the controller 108, thus starting time measurement (step S64). This time-up timer is used to measure the elapsed time in image processing for one processing target lens 1.

Illumination light from the light source 41 is reflected by the reflection screen 40. This light passes through the imaging lens 39 and condenser lenses 38b and 38a and strikes the concave surface of the processing target lens 13. The image transmitted through the processing target lens 13 is reflected by the half mirror 34, passes through the focus correction lens 50, and is projected on the light-receiving surface of the image sensing unit 48. The image sensing unit 48 photoelectrically converts the image projected on the light-receiving surface and outputs the resultant image signal. Note that the focus correction lens 50 is a lens for focusing the image sensing unit 48 on the convex surface of the processing target lens 13.

The processing target lens 13 used in this embodiment is a multifocal lens called a one-piece type lens made of plastic. A multifocal lens called a one-piece type lens is designed such that a segment 13B protrudes in the form of a wedge on the convex surface side of the lens, and there is a level difference at the boundary between a main lens 13A and the segment 13B, as shown in FIG. 19.

When the middle position of an upper rim 17 and the rotational angle of the segment 13B are to be detected by image processing on the basis of the overall contour of the segment 13B, since the segment 13B has no acute vertex, the processing becomes complicated, resulting in a deterioration in detection precision. In this embodiment, therefore, the processing target lens 13 is irradiated with illumination light from one surface side (the concave surface side in this embodiment), and the image sensing unit 48 is placed on the other surface side (convex surface side) to project only an image of the upper rim 17 of the segment 13B on the light-receiving surface of the image sensing unit 48. In this manner, of the overall contour of the segment 13B, only the upper rim 17 at the largest level difference can be clearly image-sensed. This facilitates detection of the middle position of the upper rim 17 and the rotational angle of the segment 13B by image processing.

The image processing unit 106 includes a memory for storing image data and an arithmetic processing section for performing various arithmetic processes for the image data in accordance with a program. The image processing unit 106 A/D-converts the image signal output from the image sensing unit 48 of the image sensing optical system 105, and temporarily stores the resultant image data in the internal memory (step S65).

Subsequently, the image processing unit 106 starts image processing for the input image stored in the memory. FIGS. 16A to 16F show how image processing is performed by the image processing unit 106.

Figure 16A:
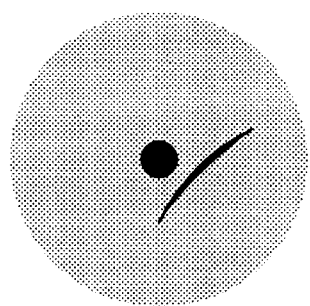
FIGS. 16A to 16F are views for explaining how image processing is performed by an image processing unit in the fourth embodiment of the present invention.
Figure 16B:
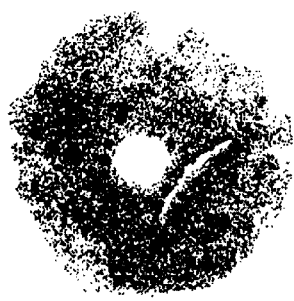
Figure 16C:
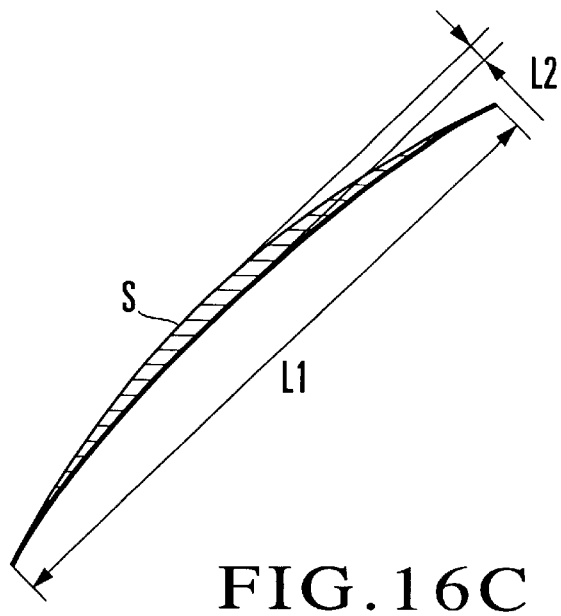
Figure 16D:
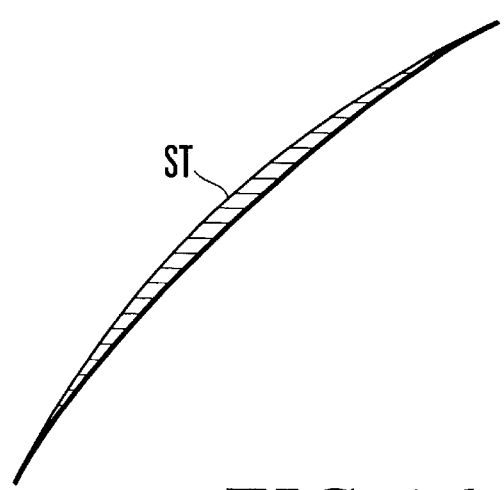

First of all, the image processing unit 106 compares the input image shown in FIG. 16A with a predetermined first threshold, and extracts pixels whose luminance values are equal to or more than the first threshold from the image without any change. The image processing unit 106 performs static threshold processing for pixels whose luminance values are less than the first threshold to set the luminance values to 0, thereby removing the background area from the input image and extracting a lens area. The image processing unit 106 stores this lens area in the memory (step S66).

The image processing unit 106 calculates the difference between the blurred image obtained by smoothing the image stored in the memory, which has undergone the static threshold processing, and the image having undergone the static threshold processing for each pixel, and performs dynamic threshold processing to assign "1" to each pixel corresponding to the calculated difference equal to or more than a predetermined second threshold and assign "0" to each pixel corresponding to the calculated difference less than the second threshold, thereby binarizing the image having undergone the static threshold processing (step S67).

In this dynamic threshold processing, the contours are sharpened by difference processing, and "1" is assigned to each portion exhibiting a large difference output, i.e., each portion that is likely to be a contour portion of an object, while "0" is assigned to each of the remaining portions. Even if, therefore, slight illumination irregularity or halation occurs in image-sensing, the processing target lens 13, the shape of the upper rim (to be referred to as a segment top hereinafter) 17 of the segment 13B can be extracted. With this dynamic threshold processing, an image like the one shown in FIG. 16B can be obtained. The image processing unit 106 stores the image having undergone the dynamic threshold processing in the memory.

The binarized image often contains dust, dirt, and the like on the surface of the processing target lens 13. For this reason, the segment top cannot be directly detected from the binarized image obtained by dynamic threshold processing. Therefore, the segment top is detected by removing noise components.

The image processing unit 106 performs labeling processing in which a set of concatenated pixels "1" in the binarized image having undergone dynamic threshold processing is regarded as one concatenation component, and the same label (number or name) is assigned to each pixel within the same concatenation component. The image processing unit 106 then extracts geometrical feature parameters from the respective concatenation components and stores them in the memory. In this case, as feature parameters of each concatenation component, the image processing unit 106 extracts an area S, major axis L1, and minor axis L2 of the concatenation component (the number of pixels of the concatenation component) shown in FIG. 16C. Each of FIGS. 16C to 16F shows a pixel-"1" region by hatching.

The image processing unit 106 extracts a concatenation component whose area S falls within a first area range, major axis L1 falls within a predetermined major axis range, and minor axis L2 falls within a predetermined minor axis range as a region similar to the segment top (to be referred to as a segment top region ST hereinafter), and stores the position of the extracted segment top region ST in the memory (step S68). In this manner, the segment top region ST like the one shown in FIG. 16D can be extracted.

The extracted segment top region ST contains projection-like noise components. For this reason, the image processing unit 106 compresses the extracted segment top region ST by a predetermined number of pixels first, and then decompresses the region by the same number of pixels. When the segment top region ST is compressed, the projection-like noise components disappear. If, therefore, the segment top region ST is decompressed, the projection-like noise components can be removed from the segment top region ST and shape correction can be performed (step S69).

Figure 16E:
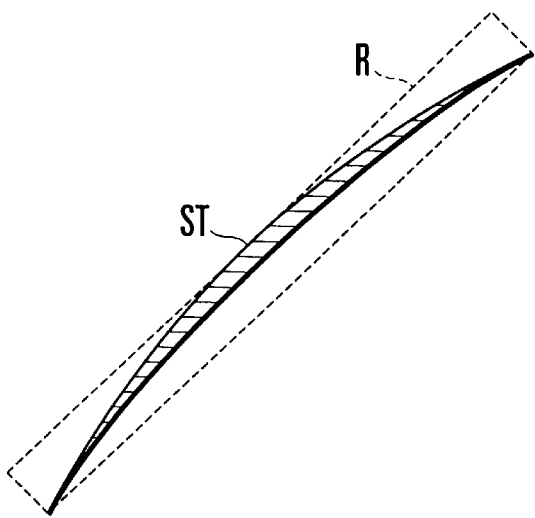

Subsequently, the image processing unit 106 obtains a smallest rectangle R containing the segment top region ST, as shown in FIG. 16E (step S70). The image processing unit 106 counts the number of segment top regions ST and stores the count in the memory (step S71).

The image processing unit 106 checks whether the number of segment top regions counted in step S71 is 1 (step S72). If the number of segment top regions is not 1, the image processing unit 106 checks whether the elapsed time that is being measured by the time-up timer exceeds predetermined seconds (e.g., 4 sec) (step S73).

If the elapsed time does not exceed the predetermined seconds, the image processing unit 106 executes the processing in steps S65 to S72 again. In this manner, if the number of segment top regions is not 1 (i.e., a portion other than the segment top is detected) and the elapsed time does not exceed the predetermined seconds, the processing in steps S65 to S72 is repeatedly executed.

If it is determined in step S73 that the elapsed time exceeds the predetermined seconds, the image processing unit 106 determines that the segment top cannot be detected by image processing, and performs image processing impossibility error processing to notify the controller 108 of the impossibility of image processing. Upon reception of the notification, the controller 108 performs processing, e.g., removing the processing target lens 13 suffering the image processing impossibility error from the image sensing processing apparatus.

Figure 16F:
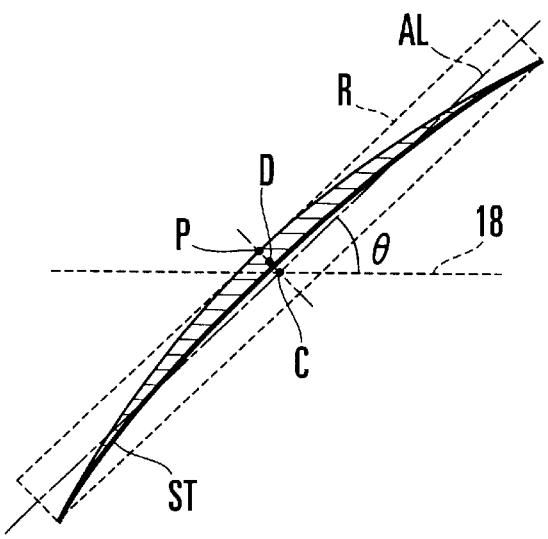

If it is determined in step S72 that the number of segment top regions is 1, the image processing unit 106 calculates the coordinates of a center C of the rectangle R and the coordinates of a contact point P (reference position) of the segment top region ST and a long side of the rectangle R, and also obtains a longitudinal axis AL of the rectangle R, as shown in FIG. 16F. The image processing unit 106 then calculates an angle (the rotational angle of the processing target lens 13 with respect to a horizontal reference line 2) $\theta$ defined by the axis AL and the horizontal reference line 2 of the image sensing processing apparatus, and stores the coordinates of the center C and contact point P and the rotational angle $\theta$ in the memory (step S74).

The processing target lens 13 has undergone an angular deviation, when supplied, with respect to the normal position on the image sensing processing apparatus. To calculate the rotational angle $\theta$ is to obtain this angular deviation.

The image processing unit 106 calculates the coordinates of a center of gravity D of the segment top region ST and stores it in the memory (step S75).

Subsequently, the image processing unit 106 checks whether the coordinates of the center C, contact point P, and center of gravity D and the rotational angle $\theta$ are acquired five times (step S76). If they are not acquired five times, the flow returns to step S64 to reset the time-up timer to 0 and perform the above processing again. With this operation, the processing in steps S64 to S75 is repeated until the respective coordinates and rotational angle $\theta$ are acquired five times.

After the coordinates of the center C, contact point P, and center of gravity D and the rotational angle $\theta$ are acquired five times, the image processing unit 106 removes the minimum and maximum values from the five coordinate values of the center C stored in the memory, obtains the average of the three remaining coordinate values, and sets the average value as the final coordinate value of the center C. Likewise, the image processing unit 106 obtains the average values of the coordinate values of the contact P and center of gravity D and the average value of the acquired values of the rotational angle $\theta$ (step S77 in FIG. 15). By averaging the acquired values of each data upon removing the minimum and maximum values therefrom, the resultant data can be stabilized.

After the averaging processing, the image processing unit 106 checks whether the center of gravity D is located above the center C (step S78). If the processing target lens 13 is supplied upside down to the image sensing processing apparatus, the center of gravity D is located below the center C. If the center of gravity D is located below the center C, the image processing unit 106 performs upside down error processing to notify the controller 108 that the processing target lens 13 is supplied upside down and falls outside the allowable range of the image sensing processing apparatus. Upon reception of the notification, the controller 108 performs processing, e.g., removing the processing target lens 13 suffering the upside down error from the image sensing processing apparatus.

If the center of gravity D is located above the center C, the image processing unit 106 checks whether the rotational angle θ falls within a predetermined range (e.g., ±60°) (step S79). If the rotational angle θ falls outside the predetermined range, the image processing unit 106 performs angle over error processing to notify the controller 108 that the rotational angle of the processing target lens 13 falls outside the allowable range of the image sensing processing apparatus. Upon reception of the notification, the controller 108 performs processing, e.g., removing the processing target lens 13 suffering the angle over error from the image sensing processing apparatus.

If the rotational angle θ falls within the predetermined range, the image processing unit 106 rotates the binarized image having undergone the above dynamic threshold processing about the center of the image as a rotation center through the rotational angle θ, thereby making the segment top region ST parallel to the horizontal reference line 2 (step S80). The binarized image is rotated to make correct left-/right-eye lens determination on the processing target lens 13 in the next left-/right-eye lens determination processing.

The image processing unit 106 then checks whether the processing target lens 13 is a right- or left-eye lens (step S81). In the case of the multifocal lens 13, the segment 13B is located closer to the ear side than the geometrical center O. If, therefore, the segment top region ST is located on the right side with respect to the center of the binarized image, the processing target lens is a right-eye lens. If the segment top region ST is located on the left side, the processing target lens is a left-eye lens.

When the image processing unit 106 is to check whether the segment top region ST is located on the left or right side with reference to the center of the binarized image, the center of the binarized image must coincide with the position of the geometrical center O of the processing target lens 13. This positioning operation is performed by the centering mechanism of the lens supply unit 103. More specifically, in conveying the processing target lens 13 to the lens support cylinder 42 of the image sensing optical system 105, the lens supply unit 103 centers the processing target lens 13 to position the geometrical center O of the processing target lens 13 to the center of the lens support cylinder 42 within an error of about ±1 mm.

The image processing unit 106 transmits the left-/right-eye lens determination on the processing target lens 13, the coordinates of the contact point P and center of gravity D, and the rotational angle θ to the controller 108. The controller 108 transmits the left-/right-eye lens determination on the processing target lens 13 and the rotational angle θ to the host computer 109 (step S82). The controller 108 turns on the light source 41 of the image sensing optical system 105 (step S83).

The host computer 109 has already read the bar code stuck on the tray of the processing target lens 13 using the bar code reader when the lens was supplied to the image sensing processing apparatus. On this bar code, information indicating that the processing target lens 13 is a right- or left-eye lens is written. The host computer 109 can therefore check whether the contents represented by the bar code coincide with the actual processing target lens 1 placed on the tray, by collating the result read from the bar code with the left-/right-eye lens determination result sent from the controller 108.

The host computer 109 performs angle correction with respect to the prestored layout data of the processing target lens 13 (the data representing the positional relationship between the geometrical center O and eyepoint 16) in accordance with the rotational angle θ, and then computes block data (data representing the relative position of the eyepoint 16 with reference to the reference position) on the basis of the layout data having undergone the angle correction. The host computer 109 transmits the block data to the controller 108.

For the processing target lens 13, the reference position is the center of the upper rim 17 of the segment 13B. Therefore, the contact point P detected by the image processing unit 106 is the reference position of the processing target lens 13. At this time, the contact point P deviates from the normal position on the image sensing processing apparatus due to positional deviations caused in the horizontal direction (the lateral direction in FIGS. 16A to 16F) and vertical direction (the longitudinal direction in FIGS. 16A and 16F) when it was supplied. That is, the processing target lens 13 has undergone positional deviations in the horizontal and vertical directions. The block data has been calculated on the premise that the angular deviation of the processing target lens 13 has been corrected as described, and there are no positional deviations in the horizontal and vertical directions.

Therefore, in conveying the processing target lens 13 from the image sensing optical system 105 to a predetermined lens holding position by using the lens supply unit 103, the controller 108 corrects the positional deviations of the processing target lens 13 in the horizontal and vertical directions on the basis of the coordinates of the contact point P, and then controls the lens supply unit 103 to position the eyepoint 16 of the processing target lens 13 immediately below the lens holder 200 held by the holder holding unit 104 on the basis of block data from the host computer 109 (step S84).

To correct the angular deviation caused when the processing target lens 13 is supplied, the controller 108 controls the holder holding unit 104 to rotate the lens holder 200 through the rotational angle θ to perform angle correction (step S85). The controller 108 then controls the holder holding unit 104 to lower the lens holder 200 so as to bring the elastic seal 201 stuck on the lens holder 200 into tight contact with the processing target lens 13. With this operation, as shown in FIG. 2, the lens holder 200 is mounted at the processing center (eyepoint 16) of the processing target lens 13 through the elastic seal 201 (step S86).

The controller 108 controls the holder holding unit 104 to convey the lens holder 200 to a predetermined extraction position, together with the processing target lens 13 (step S87), and then controls the lens convey unit 107 to convey the processing target lens 13 at the extraction position to the edger (step S88).

With the above operation, the processing performed by the image sensing processing apparatus for the processing target lens 13 is completed.

The processing target lens 13 conveyed to the edger is subjected to edging such as an arris process by the edger on the basis of the lens frame shape data and the prescription data of a wearer, thereby manufacturing a spectacle lens having a contour shape almost conforming to the shape of a frame.

According to this embodiment, an image of the processing target lens 13 is sensed and binarized. Geometrical feature parameters of each graphic pattern contained in the binarized image are extracted. Graphic patterns with these feature parameters satisfying predetermined conditions are extracted as an image of the upper rim 17 of the segment 13B formed on the processing target lens 13 in advance. The reference position P having a predetermined positional relationship with the processing center position 16 is obtained on the binarized image on the basis of the position of the extracted upper rim 17. This makes it possible to realize accurate positioning and reduce the burden imposed on the operator as compared with the prior art in which the operator manually positions the actual spectacle lens and a graphic pattern of a spectacle lens on a remark chart or a reference image of a spectacle lens displayed on the screen of a TV monitor. As a consequence, the spectacle lens 13 and lens holder 200 can be accurately and efficiently positioned in a short period of time.

In addition, the spectacle lens 13 having the level difference at the boundary between the main lens 13A and the segment 13B is irradiated with illumination light from one surface side to sense an image of the spectacle lens 13 from the other surface side. This makes it possible to obtain only an image of the upper rim 17 of the contour of the segment 13B, thus facilitating obtaining the reference position P and rotational angle θ of the spectacle lens 13.

The smallest rectangle R containing the upper rim 17 of the segment 13B is obtained on the binarized image, and the rotational angle θ of the spectacle lens 13 with respect to the normal position is obtained on the basis of the position of the rectangle R. This makes it possible to obtain the processing center position 16 of the spectacle lens 13 upon angle correction. In addition, the processing for the spectacle lens 13 suffering a considerable angular deviation can be stopped.

Furthermore, the binarized image is rotated in accordance with the rotational angle θ to make the upper rim 17 of the segment 13B horizontal, and it is checked on the basis of the position of the upper rim 17 on the binarized image after the rotation processing whether the spectacle lens 13 is a left- or right-eye lens. This makes it possible to correctly check whether the processing target lens 13 is a left- or right-eye lens. It can also be checked whether the spectacle lens 13 different from a desired lens is supplied by mistake. If it is determined that the spectacle lens 13 is supplied by mistake, the processing for the spectacle lens 13 can be stopped.

The smallest rectangle R containing the upper rim 17 of the segment 13B is obtained on the sensed binarized image, and the vertical posture of the spectacle lens 13 is determined on the basis of the center position of the rectangle R and the position of the center of gravity of the upper rim 17. This makes it possible to stop the processing for the spectacle lens 13 supplied upside down.

Layout data representing the positional relationship between the reference position P and the processing center position 16 is stored in the host computer 109 serving as a computation means independent of the image processing unit 106. The host computer 109 is then made to calculate the processing center position 16 of the spectacle lens 13. This eliminates the necessity to hold a large volume of data in the image processing unit 106, and facilitates registration of layout data corresponding to the spectacle lens 13 to be processed.

What is claimed is:

1. A spectacle lens positioning method comprising:
   the step of sensing an image of a spectacle lens to be processed and binarizing the image;
   the step of extracting a geometrical feature parameter of each graphic pattern contained in the binarized image, and extracting a graphic pattern whose feature parameter satisfies a predetermined condition as an image of a micro engraved mark formed on the spectacle lens in advance; and
   the step of obtaining a reference position having a predetermined positional relationship with a processing center position at which a processing jig is to be mounted, on the binarized image, on the basis of a position of the extracted micro engraved mark.

2. A method according to claim 1, wherein at least said two micro engraved marks formed on the lens in advance are extracted on the binarized image, and a rotational angle of the lens with respect to a normal position is obtained on the basis of positions of the micro engraved marks.

3. A method according to claim 1, wherein an angle correction is made to layout data representing a positional relationship between the reference position and the processing center position in accordance with the rotational angle, and the processing center position is obtained on the basis of the layout data after the angle correction.

4. A method according to claim 1, wherein at least said two micro engraved marks formed on the spectacle lens in advance are extracted on the binarized image, a character representing an addition power which is formed on the lens in advance is detected on the binarized image on the basis of positions of the micro engraved marks, and whether the spectacle lens is a right- or left-eye lens is determined from a position of the detected character.

5. A method according to claim 1, wherein at least said two micro engraved marks formed on the spectacle lens in advance are extracted on the binarized image, a character representing an addition power which is formed on the lens in advance is detected on the binarized image on the basis of positions of the micro engraved marks, and whether the spectacle lens is upside down is determined from a position of the detected character.

6. A spectacle lens image sensing processing apparatus comprising an image sensing optical system for sensing an image of a spectacle lens to be processed, and an image processing unit for binarizing the sensed image, extracting a geometrical feature parameter of each graphic pattern contained in the binarized image, extracting a graphic pattern whose feature parameter satisfies a predetermined condition as an image of a micro engraved mark formed on the spectacle lens in advance, and obtaining a reference position having a predetermined relationship with a processing center position at which a processing jig is to be mounted, on the binarized image, on the basis of a position of the extracted micro engraved mark.

7. An apparatus according to claim 6, wherein said image processing unit extracts at least said two micro engraved marks formed on the lens in advance on the binarized image, and obtains a rotational angle of the lens with respect to a normal position on the basis of positions of the micro engraved marks.

8. An apparatus according to claim 7, further comprising computation means for storing layout data representing a positional relationship between the reference position and the processing center position for each spectacle lens in advance, making an angle correction to the layout data corresponding to the spectacle lens to be processed in accordance with the angular deviation, and obtaining the processing center position on the basis of the layout data after the angle correction.

9. A spectacle lens positioning method comprising:

the step of sensing an image of a spectacle lens to be processed and binarizing the image;

the step of extracting a geometrical feature parameter of each graphic pattern contained in the binarized image, and extracting a graphic pattern whose feature parameter satisfies a predetermined condition as an image of an upper rim of a segment formed on the spectacle lens in advance; and the step of obtaining a reference position having a predetermined positional relationship with a processing center position at which a processing jig is to be mounted, on the binarized image, on the basis of a position of the extracted upper rim of the segment.

10. A method according to claim 9, wherein the spectacle lens having a level difference at a boundary between a main lens and the segment is irradiated with illumination light from one surface side, and an image of the spectacle lens is sensed from the other surface side, thereby obtaining an image of only the upper rim of a contour of the segment.

11. A method according to claim 9, wherein a smallest rectangle containing the upper rim of the segment is obtained on the binarized image, and an angular deviation of the spectacle lens with respect to a normal position is obtained on the basis of a position of the rectangle.

12. A method according to claim 11, wherein an angle correction is made to layout data representing a positional relationship between the reference position and the processing center position in accordance with the rotational angle, and the processing center position is obtained on the basis of the layout data after the angle correction.

13. A method according to claim 11, wherein the binarized image is rotated in accordance with the angular deviation to make the upper rim of the segment horizontal, and whether the spectacle lens is a right- or left-eye lens is determined on the basis of a position of the upper rim of the segment on the binarized image after rotation processing.

14. A method according to claim 9, wherein a smallest rectangle containing the upper rim of the segment is obtained on the binarized image, and whether the spectacle lens is upside down is determined on the basis of a center position of the rectangle and a position of a center of gravity of the upper rim of the segment.

15. A spectacle lens image sensing processing apparatus comprising:

an image sensing optical system for sensing an image of a spectacle lens to be processed, and an image processing unit for binarizing the sensed image, extracting a geometrical feature parameter of each graphic pattern contained in the binarized image, extracting a graphic pattern whose feature parameter satisfies a predetermined condition as an image of an upper rim of a segment formed on the spectacle lens in advance, and obtaining a reference position having a predetermined positional relationship with a processing center position at which a processing jig is to be mounted, on the binarized image, on the basis of a position of the extracted upper rim of the segment.

16. An apparatus according to claim 15, wherein said image processing unit obtains a smallest rectangle containing the upper rim of the segment on the binarized image, and obtains an angular deviation of the spectacle lens with respect to a normal position on the basis of a position of the rectangle.

17. An apparatus according to claim 16, further comprising computation means for storing layout data representing a positional relationship between the reference position and the processing center position for each spectacle lens in advance, making an angle correction to the layout data corresponding to the spectacle lens to be processed in accordance with the angular deviation, and obtaining the processing center position on the basis of the layout data after the angle correction.

* * * * *